US012776569B2

(12) United States Patent
Jang et al.

(10) Patent No.: US 12,776,569 B2
(45) Date of Patent: Oct. 27, 2026

(54) ANTENNA AND ELECTRONIC DEVICE INCLUDING THE SAME

(71) Applicant: Samsung Electronics Co., Ltd., Suwon-si (KR)

(72) Inventors: Sooyoung Jang, Suwon-si (KR); Dongryul Shin, Suwon-si (KR); Seho Kim, Suwon-si (KR); Gyubok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 18/775,560

(22) Filed: Jul. 17, 2024

(65) Prior Publication Data

US 2024/0372247 A1 Nov. 7, 2024

Related U.S. Application Data

(63) Continuation of application No. 17/574,115, filed on Jan. 12, 2022, now Pat. No. 12,046,800, which is a (Continued)

(30) Foreign Application Priority Data

Jan. 13, 2021 (KR) ........................ 10-2021-0004841

(51) Int. Cl.
*H01Q 1/24* (2006.01)
*H01Q 1/48* (2006.01)
*H01Q 5/335* (2015.01)

(52) U.S. Cl.
CPC ............... *H01Q 1/243* (2013.01); *H01Q 1/24* (2013.01); *H01Q 1/48* (2013.01); *H01Q 5/335* (2015.01)

(58) Field of Classification Search
CPC ............ H01Q 1/243; H01Q 1/24; H01Q 1/48; H01Q 5/335
See application file for complete search history.

(56) References Cited

U.S. PATENT DOCUMENTS 10,476,167 B2 11/2019 Ayala Vazquez et al.
10,581,169 B2 3/2020 Kim et al.
(Continued)

FOREIGN PATENT DOCUMENTS

EP 3 476 004 A1 5/2019
KR 10-2017-0130820 A 11/2017
(Continued)

OTHER PUBLICATIONS

International Search Report and Written Opinion dated Apr. 12, 2022, issued in International Patent Application No. PCT/KR2022/000043.
(Continued)

*Primary Examiner* — Hai V Tran
(74) *Attorney, Agent, or Firm* — Jefferson IP Law, LLP

(57) ABSTRACT

An electronic device is provided. The electronic device includes a housing including a first segment portion and a second segment portion, a first antenna formed between the first segment portion and the second segment portion, and a processor electrically connected to the first antenna, the first antenna includes a first point disposed adjacent to the first segment portion, a third point disposed adjacent to the second segment portion, and a second point disposed between the first point and the third point, and the processor is configured to control feeding signals and/or ground signals of the first point, the second point or the third point, and control the electrical path of the first antenna between the first segment portion and the second segment portion, the first antenna operates in different frequency bands. The first antenna operating at a resonance frequency having the
(Continued)

optimum radiation efficiency and performance in a wide-band.

19 Claims, 15 Drawing Sheets

Related U.S. Application Data continuation of application No. PCT/KR2022/000043, filed on Jan. 4, 2022.

(56) References Cited

U.S. PATENT DOCUMENTS

| | | | |
|---|---|---|---|
| 10,819,012 | B2 | 10/2020 | Liu |
| 11,088,470 | B2 | 8/2021 | Kwon et al. |
| 11,309,628 | B2 | 4/2022 | Ayala Vazquez et al. |
| 2011/0102290 | A1 | 5/2011 | Milosavljevic |
| 2017/0141469 | A1 | 5/2017 | Huang |
| 2017/0373388 | A1 | 12/2017 | Wang et al. |
| 2018/0026361 | A1* | 1/2018 | Sakong .................... H01Q 1/48 343/860 |
| 2018/0102586 | A1 | 4/2018 | Shin et al. |
| 2018/0115054 | A1 | 4/2018 | Wu |
| 2018/0331418 | A1 | 11/2018 | Kim et al. |
| 2019/0027822 | A1* | 1/2019 | Ayala Vazquez ........ H01Q 1/42 |
| 2019/0027833 | A1* | 1/2019 | Ayala Vazquez ...... H01Q 5/342 |
| 2019/0165836 | A1* | 5/2019 | Irci .......................... H04B 5/48 |
| 2019/0372223 | A1 | 12/2019 | Hsu et al. |
| 2019/0393586 | A1* | 12/2019 | Ayala Vazquez ...... H01Q 5/328 |
| 2021/0044012 | A1* | 2/2021 | Ayala Vazquez ...... H01Q 1/243 |

FOREIGN PATENT DOCUMENTS

| | | | |
|---|---|---|---|
| KR | 10-2018-0010957 | A | 1/2018 |
| KR | 10-2018-0039425 | A | 4/2018 |
| KR | 10-2018-0124621 | A | 11/2018 |
| KR | 10-2020-0001470 | A | 1/2020 |
| KR | 10-2020-0144686 | A | 12/2020 |
| WO | 2018/016913 | A1 | 1/2018 |

OTHER PUBLICATIONS

Extended European Search Report dated Mar. 26, 2024, issued in European Patent Application No. 22739545.6.

Korean Office Action dated Mar. 4, 2025, issued in a Korean Patent Application No. 10-2021-0004841.

* cited by examiner

ANTENNA AND ELECTRONIC DEVICE INCLUDING THE SAME

CROSS-REFERENCE TO RELATED APPLICATION(S)

This application is a continuation application of application Ser. No. 17/574,115 filed on Jan. 12, 2022, which issued as U.S. Pat. No. 12,046,800 on Jul. 23, 2024; which is continuation application of International Application No. PCT/KR2022/000043 filed on Jan. 4, 2022; and which is based on and claims the benefit of a Korean patent application number 10-2021-0004841 filed on Jan. 13, 2021 in the Korean Intellectual Property Office, the disclosure of each of which is incorporated by reference herein in its entirety.

TECHNICAL FIELD

The disclosure relates to an antenna and an electronic device including the antenna.

BACKGROUND ART

There has been increasing use of electronic devices such as bar-type, foldable-type, and sliding-type smartphones or tablet PCs, and electronic devices are equipped with various functions.

An electronic device may be used for telephone speech with another electronic device through wireless communication, and may transmit/receive various pieces of data therewith.

The electronic device may include at least one antenna for performing wireless communication with another electronic device by using a network.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may have a housing which forms the exterior thereof, and at least a part of which is made of a conductive material (for example, metal).

At least a part of the housing made of the conductive material may be used as an antenna (for antenna radiator) for performing wireless communication. For example, the housing of an electronic device may be separated into at least one segment portion (for example, slit) and used as multiple antennas.

The antenna of the electronic device may have a resonance frequency determined according to the position of a ground and that of feeding.

If the ground and feeding have predetermined positions, the antenna of the electronic device may operate in a limited manner in a preconfigured frequency band only, and may not operate in various frequency bands.

Aspects of the disclosure are to address at least the above-mentioned problems and/or disadvantages and to provide at least the advantages described below. Accordingly, an aspect of the disclosure is to provide an electronic device capable of controlling feeding signals and/or ground signals regarding a first point to a third point disposed on a first antenna and/or a fourth point disposed on a second antenna.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a housing including a first segment portion and a second segment portion, a first antenna formed between the first segment portion and the second segment portion, and a processor electrically connected to the first antenna, wherein the first antenna includes a first point disposed adjacent to the first segment portion, a third point disposed adjacent to the second segment portion, and a second point disposed between the first point and the third point, and the processor is configured to control feeding signals and/or ground signals of the first point, the second point, and/or the third point, and control an electrical path of the first antenna between the first segment portion and the second segment portion such that the first antenna operates in different frequency bands.

In accordance with another aspect of the disclosure, an antenna is provided. The antenna includes a first antenna which is disposed between a first segment portion and a second segment portion formed at a housing and includes a first point disposed adjacent to the first segment portion, a third point disposed adjacent to the second segment portion, and a second point disposed between the first point and the third point, and a processor electrically connected to the first antenna, wherein the first antenna is configured such that feeding signals and/or ground signals of the first point, the second point and/or the third point are controlled under control of the processor.

Advantageous Effects of Invention

Various embodiments of the disclosure may provide an antenna and an electronic including the antenna, wherein feeding signals and/or ground (GND) signals are controlled with regard to a first point to a third point disposed on a first antenna and/or a fourth point disposed on a second antenna such that the same can operate in a resonance frequency having optimal radiation efficiency and performance in a broadband such as middle band (MB) and/or high band (HB).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
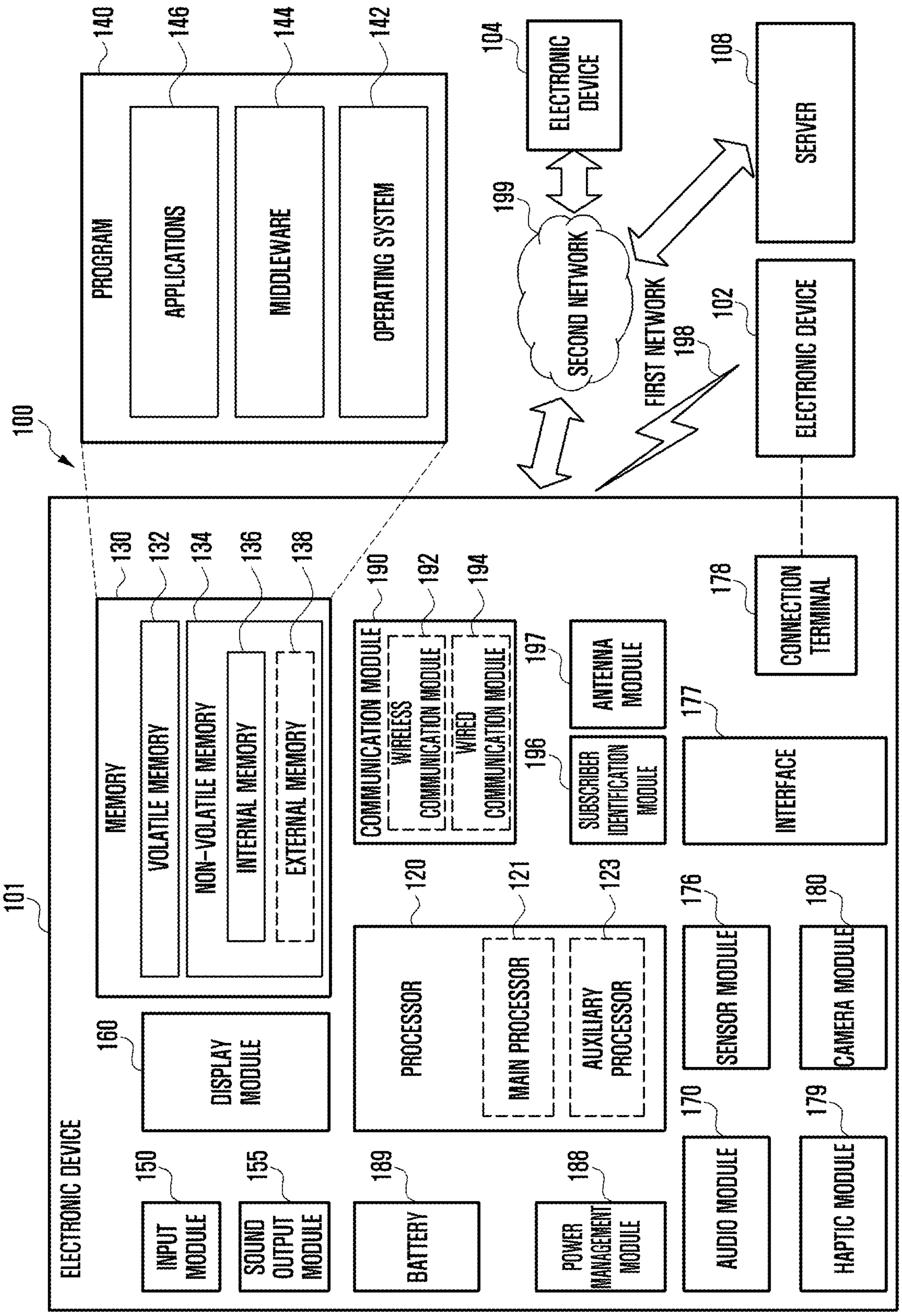
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
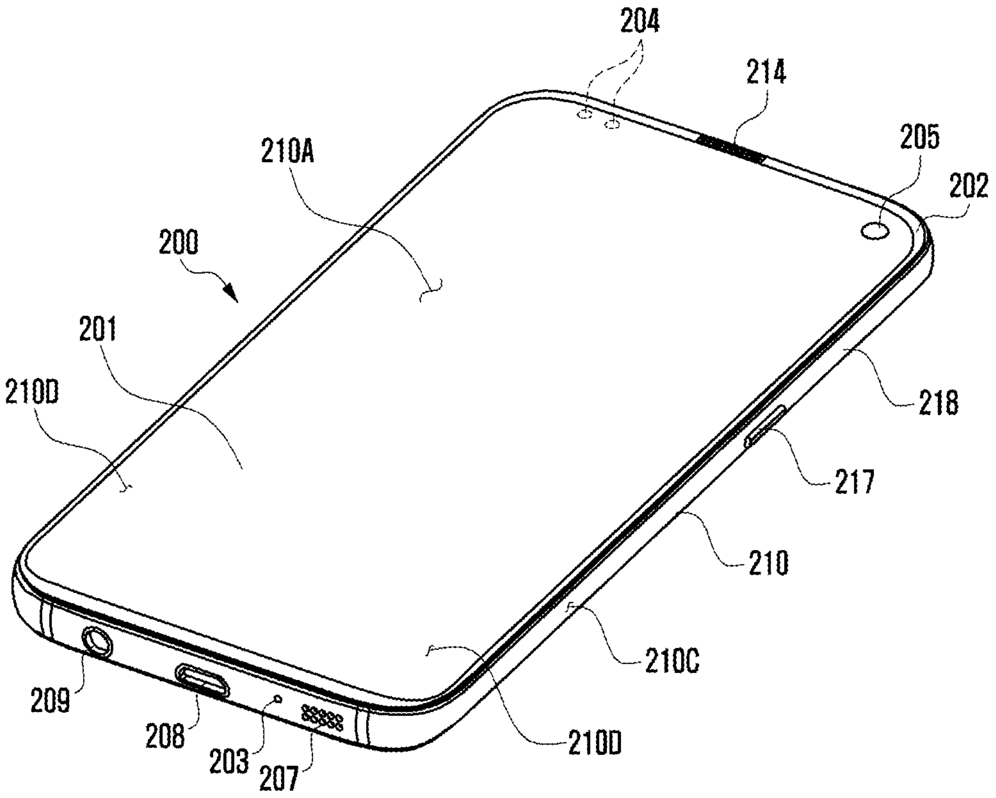
FIG. 2A is a perspective view of a front surface of an electronic device according to an embodiment of the disclosure.

FIG. 2A is a front perspective view illustrating a mobile electronic device according to an embodiment of the disclosure.

Figure 2B:
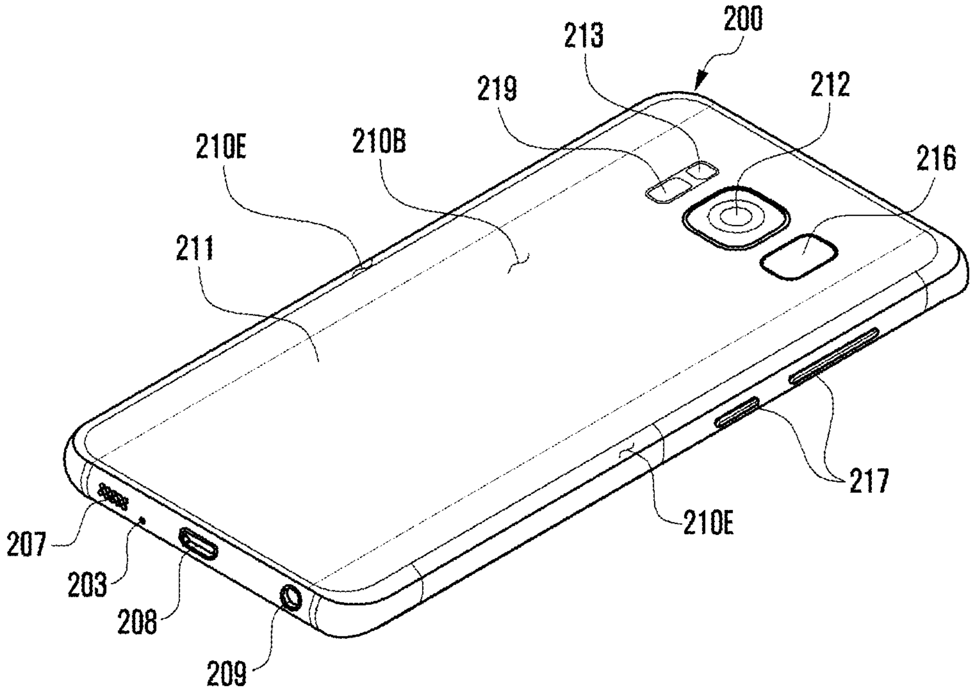
FIG. 2B is a perspective view of a rear surface of an electronic device according to an embodiment of the disclosure.

FIG. 2B is a rear perspective view illustrating a mobile electronic device according to an embodiment of the disclosure.

Referring to FIGS. 2A and 2B, an electronic device 200 (e.g., the electronic device 101 of FIG. 1) according to various embodiments may include a housing 210 including a first surface (or front surface) 210A, a second surface (or rear surface) 210B, and a side surface 210C enclosing a space between the first surface 210A and the second surface 210B. In one embodiment (not illustrated), the housing (210) may refer to a structure forming some of the first surface 210A, the second surface 210B, and the side surface 210C. According to one embodiment, the first surface 210A may be formed by an at least partially substantially transparent front plate 202 (e.g., a polymer plate or a glass plate including various coating layers). The second surface 210B may be formed by a substantially opaque rear plate 211. The rear plate 211 may be formed by, for example, coated or colored glass, ceramic, polymer, metal (e.g., aluminum, stainless steel (STS), or magnesium), or a combination of at least two of the above materials. The side surface 210C may be coupled to the front plate 202 and the rear plate 211 and be formed by a side bezel structure (or "side member") 218 including a metal and/or a polymer. In some embodiments, the rear plate 211 and the side bezel structure 218 may be integrally formed and include the same material (e.g., metal material such as aluminum).

In the illustrated embodiment, the front plate 202 may include two first regions 210D bent and extended seamlessly from the first surface 210A toward the rear plate 211 at both ends of a long edge of the front plate 202. In the illustrated embodiment (see FIG. 2B), the rear plate 211 may include two second regions 210E bent and extended seamlessly from the second surface 210B towards the front plate 202 at both ends of a long edge. In some embodiments, the front plate 202 (or the rear plate 211) may include only one of the first regions 210D (or the second regions 210E). In one embodiment, a portion of the first regions 210D or the second regions 210E may not be included. In the above embodiments, when viewed from the side surface of the mobile electronic device 200, the side bezel structure 218 may have a first thickness (or width) at a side surface in which the first region 210D or the second region 210E is not included and have a second thickness smaller than the first thickness at a side surface including the first region 210D or the second region 210E.

According to one embodiment, the electronic device 200 may include at least one of a display 201, input module 203, audio modules 207 and 314, sensor modules 204 and 219, camera modules 205, 212, and 213, key input device 217, indicator (not illustrated), and/or connector holes 208 and 209. In some embodiments, the electronic device 200 may omit at least one (e.g., the key input device 217 or indicator) of the components or may further include other components.

The display 201 may be exposed through, for example, a substantial portion of the front plate 202. In some embodiments, at least part of the display 201 may be exposed through the front plate 202 forming the first region 210D of the side surface 210C and the first surface 210A. In one embodiment, the display 201 may be coupled to or disposed adjacent to a touch detection circuit, a pressure sensor capable of measuring intensity (pressure) of the touch, and/or a digitizer for detecting a stylus pen of a magnetic field method. In some embodiments, at least part of the sensor modules 204 and 219 and/or at least part of the key input device 217 may be disposed in a first region 210D and/or a second region 210E.

The audio modules 203, 207, and 214 may include a microphone hole 203 and speaker holes 207 and 214. The microphone hole 203 may dispose a microphone for obtaining an external sound therein; and, in some embodiments, a plurality of microphones may be disposed to detect a direction of a sound. The speaker holes 207 and 214 may include an external speaker hole 207 and a call receiver hole 214. In some embodiments, the speaker holes 207 and 214 and the microphone hole 203 may be implemented into one hole, or the speaker may be included without the speaker holes 207 and 214 (e.g., piezo speaker).

The sensor modules 204, 216 and 219 may generate an electrical signal or a data value corresponding to an operating state inside the electronic device 200 or an environment state outside the mobile electronic device 200. The sensor modules 204, 216, and 219 may include, for example, a first sensor module 204 (e.g., proximity sensor) and/or a second sensor module (not illustrated) (e.g., fingerprint sensor), disposed at the first surface 210A of the housing 210, and/or a third sensor module 219 (e.g., a heart rate monitor (HRM) sensor) and/or a fourth sensor module 216 (e.g., fingerprint sensor), disposed at the second surface 210B of the housing 210. The fingerprint sensor may be disposed at the second surface 210B as well as the first surface 210A (e.g., the display 201) of the housing 210. The electronic device 200 may further include a sensor module (not illustrated), for example, at least one of a gesture sensor, gyro sensor, air pressure sensor, magnetic sensor, acceleration sensor, grip sensor, color sensor, IR sensor, biometric sensor, temperature sensor, humidity sensor, and illumination sensor 304.

The camera modules 205, 212, and 313 may include a first camera module 205 disposed at the first surface 210A of the mobile electronic device 200, a second camera device 212 disposed at the second surface 210B thereof, and/or a flash 213. The camera modules 205 and 212 may include one or a plurality of lenses, an image sensor, and/or an image signal processor. The flash 213 may include, for example, a light emitting diode or a xenon lamp. In some embodiments, two or more lenses (infrared camera, wide angle and telephoto lens) and image sensors may be disposed at one surface of the electronic device 200.

The key input device 217 may be disposed at the side surface 210C of the housing 210. In one embodiment, the electronic device 200 may not include some or all of the above-described key input devices 217, and the key input device 217 that is not included may be implemented in other forms such as a soft key on the display 201. In some embodiments, the key input device 217 may include a sensor module 216 disposed at the second surface 210B of the housing 210.

The indicator may be disposed at, for example, the first surface 210A of the housing 210. The indicator may provide, for example, status information of the electronic device 200 in an optical form. In one embodiment, the indicator may provide, for example, a light source interworking with an operation of the camera module 205. The indicator may include, for example, a light emitting diode (LED), an IR LED, and a xenon lamp.

The connector holes 208 and 209 may include a first connector hole 208 that may receive a connector (e.g., a USB connector) for transmitting and receiving power and/or data to and from an external electronic device and/or a second connector hole (e.g., earphone jack) 209 that can receive a connector for transmitting and receiving audio signals to and from an external electronic device.

Figure 3:
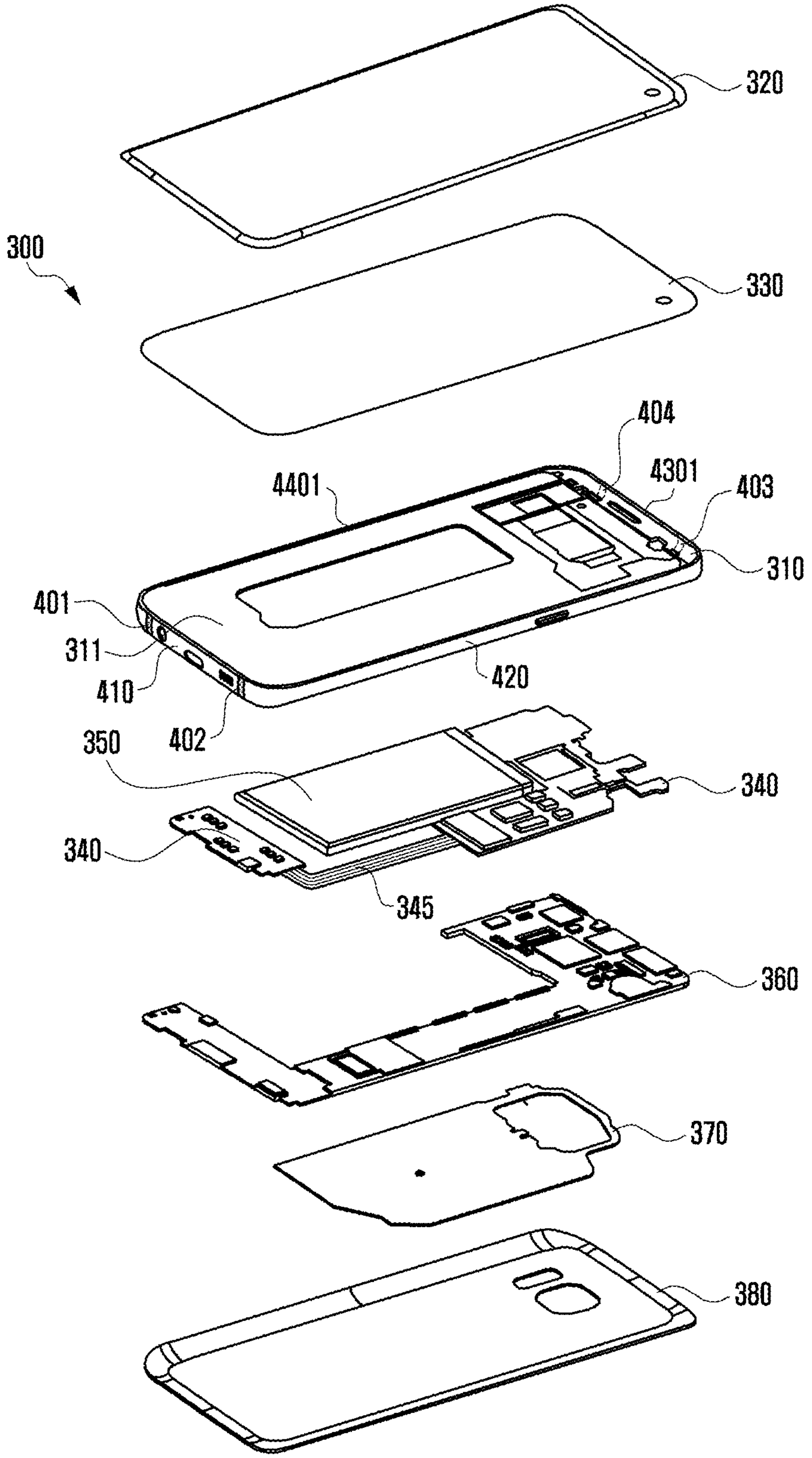
FIG. 3 is an exploded perspective view of an electronic device according to an embodiment of the disclosure.

FIG. 3 is an exploded perspective view of the electronic device according to an embodiment of the disclosure.

Referring to FIG. 3, an electronic device 300 may include a housing 310 (or a side bezel structure), a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 to FIG. 2B, and repeated descriptions thereof will be omitted herein.

The first support member 311 may be arranged inside the electronic device 300 and connected to the side bezel structure (i.e., housing 310), or may be formed integrally with the side bezel structure (i.e., housing 310). The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

Figure 4:
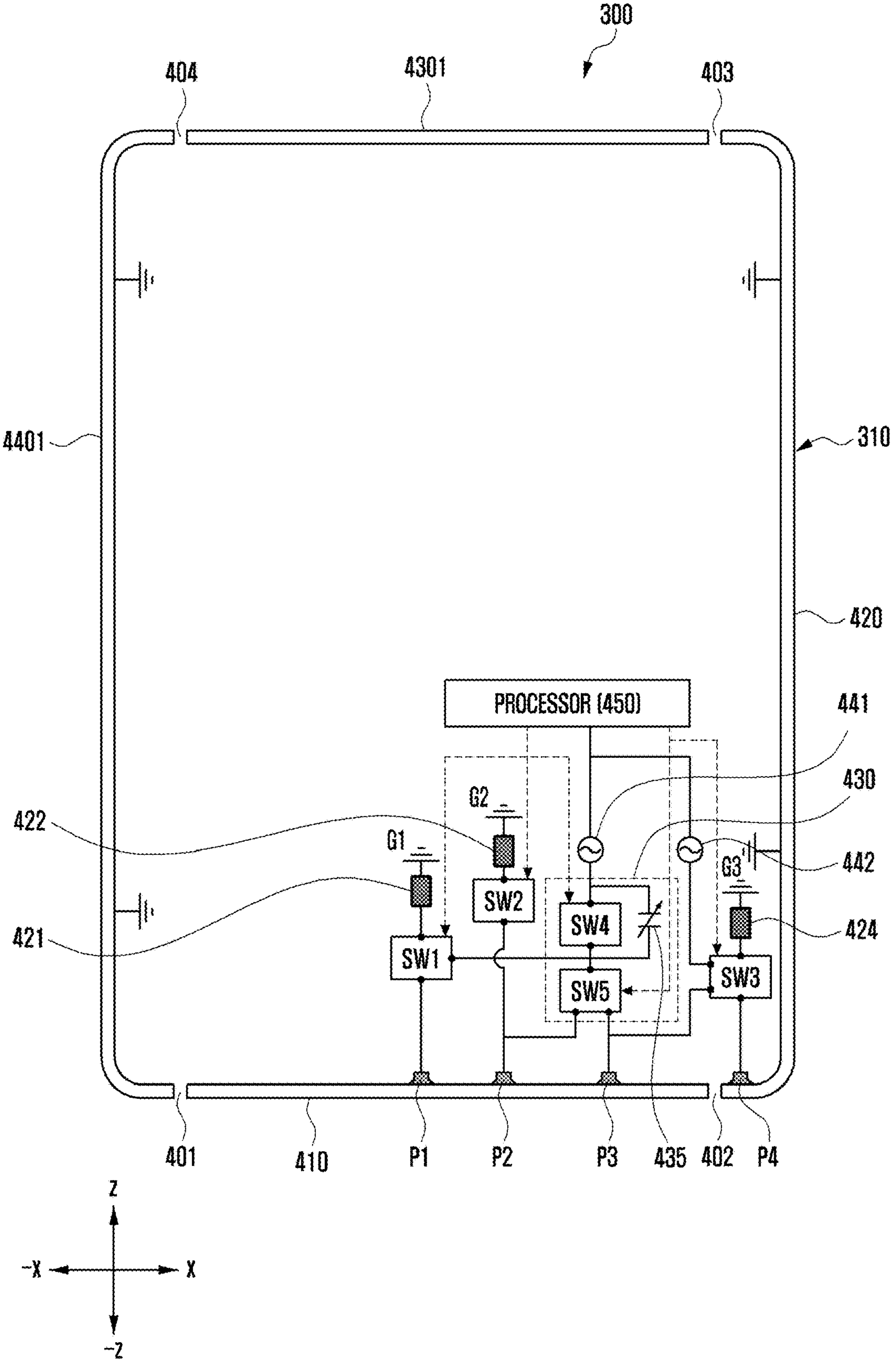
FIG. 4 schematically illustrates a configuration of an antenna and a circuit configuration of an electronic device according to an embodiment of the disclosure.

According to various embodiments, for example, a first matching circuit SW1, a second matching circuit SW2, a tuner 430 in FIG. 4, a third matching circuit SW3, and/or a processor 450, illustrated in FIG. 4, may be disposed on the printed circuit board 340. The printed circuit board 340 may include a ground (not shown). The ground of the printed circuit board 340 may be connected to at least one ground formed at, for example, a second antenna 420 and/or a fourth antenna 4401 in FIG. 4.

According to various embodiments, at least a portion of the printed circuit board 340 may be formed in a first direction (e.g., the upper side) and/or a second direction (e.g., the lower side) of the electronic device 300. The printed circuit board 340 may include a structure in which multiple printed circuit boards (PCBs) are laminated. The printed circuit board 340 may include an interposer structure. The printed circuit board 340 may be implemented in the form of a flexible printed circuit board (FPCB) and/or in the form of a rigid printed circuit board (PCB). The printed circuit boards 340 provided in the first direction (e.g., the upper side) and the second direction (e.g., the lower side) may be electrically connected to each other through the signal connection member 345 (e.g., a coaxial cable or a FPCB).

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure (i.e., housing 310) and/or the first support member 311.

According to an embodiment, the housing 310 may form the exterior of the electronic device 300. The housing 310 may include, for example, a first antenna 410 physically separated by a first segment portion 401 and a second segment portion 402, which are formed on the first portion (e.g., a lower surface or a bottom portion). The housing 310 may include, for example, a second antenna 420 (e.g., the third portion) physically separated by the second segment portion 402 and a third segment portion 403 formed on the second portion (e.g., an upper surface or a top portion).

According to various embodiments, the housing 310 may include, for example, a third antenna 4301 physically separated by the third segment portion 403 and a fourth segment portion 404, which are formed on the second portion (e.g., the upper surface or the top portion). The housing 310 may include, for example, a fourth antenna 4401 (e.g., the fourth portion) physically separated by the fourth segment portion 404 and the first segment portion 401 formed on the first portion (e.g., the lower surface or the bottom portion).

According to various embodiments, the housing 310 of the electronic device 300 according to various embodiments of the disclosure is not limited to the first antenna 410, the second antenna 420, the third antenna 4301, and/or the fourth antenna 4401, and may further include more n-th antennas according to the number of segment portions.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,”

"logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 4 schematically illustrates a configuration of an antenna and a circuit configuration of an electronic device according to an embodiment of the disclosure.

An electronic device 300 in FIG. 4 may include the embodiments described in relation to the electronic device 101 in FIG. 1, the electronic device 200 in FIGS. 2A and 2B, and/or the electronic device 300 in FIG. 3. In describing FIG. 4, identical reference numerals may be assigned to the same elements as those in the embodiment of the electronic device 300 illustrated in FIG. 3, and a redundant description thereof may be omitted.

In an embodiment, an embodiment related to the electronic device 300 in FIG. 4 describes a bar-type electronic device, but is not limited thereto and may also be applied to an electronic device such as a foldable type, a rollable type, a slidable type, a wearable type, a tablet personal computer (PC), and/or a notebook PC.

Referring to FIG. 4, at least a portion of a housing 310 of the electronic device 300 according to various embodiments of the disclosure may be physically separated by a first segment portion 401, a second segment portion 402, a third segment portion 403, and/or a fourth segment portion 404, and may be used as an antenna (or an antenna radiator). The housing 310 may be formed by a side bezel structure including metal (e.g., aluminum or aluminum alloy) and/or polymer.

According to an embodiment, the housing 310 may include a first antenna 410 having a first length, a second antenna 420, which extends in the perpendicular direction (e.g., z-axis direction) from the first antenna 410 and has a second length longer than the first length, a third antenna 4301, which extends from the second antenna 420 in a direction substantially parallel to the first antenna 410 (e.g., −x-axis direction) and has substantially the same length as the first length, and/or a fourth antenna 4401, which extends from the third antenna 4301 in a direction substantially parallel to the second antenna 420 (−z-axis direction) and has substantially the same length as the second length.

According to various embodiments, the first antenna 410 to the fourth antenna 4401 may be used as antenna radiators for transmitting and receiving wireless signals. The first antenna 410 to the fourth antenna 4401 may operate in a first frequency band to a fourth frequency band. For example, the first frequency band to the fourth frequency band may include a sub-6 band (e.g., about 3.3 GHz to 3.8 GHZ) and/or a frequency band of a legacy band (e.g., a low band (LB), a middle band (MB), and/or a high band (HB)). The first frequency band to the fourth frequency band are not limited to the above-described examples, and may transmit and receive signals of other frequency bands.

According to an embodiment, the first antenna 410 may be formed to be physically separated by a first segment portion 401 and a second segment portion 402, which are formed on a first portion (e.g., a lower surface or a bottom portion) of the housing 310. The second antenna 420 may be formed to be physically separated by the second segment portion 402 and a third segment portion 403 formed on a second portion (e.g., an upper surface or a top portion) of the housing 310. The third antenna 4301 may be formed to be physically separated by the third segment portion 403 and a fourth segment portion 404, which are formed on the second portion (e.g., the upper surface or the top portion) of the housing 310. The fourth antenna 4401 may be formed to be physically separated by the fourth segment portion 404 formed the second portion (e.g., the upper surface or the top portion) of the housing 310, and the first segment portion 401 formed on the first portion (e.g., the lower surface or the bottom portion) of the housing 310.

According to various embodiments, each of the first segment portion 401, the second segment portion 402, the third segment portion 403, and the fourth segment portion 404 may be filled with a non-conductive member (not shown). The non-conductive member may prevent foreign matter from infiltrating into the electronic device 300 from outside the electronic device 300. The non-conductive member may include a dielectric (e.g., insulator) material which includes at least one among polycarbonate, polyimide, plastic, polymer, or ceramic.

According to an embodiment, the electronic device 300 may include a first matching circuit SW1, a second matching circuit SW2, a tuner 430, a third matching circuit SW3, and/or a processor 450 on a printed circuit board 340 (e.g., the printed circuit board 340 in FIG. 3) disposed in the inner space of the housing 310.

According to various embodiments, the printed circuit board 340 may include a ground (not shown). The ground of the printed circuit board 340 may be connected to, for example, at least one ground formed at the second antenna 420 and/or the fourth antenna 4401.

According to an embodiment, the first antenna 410 may include a first point P1, a second point P2, and/or a third point P3. The second antenna 420 may include a fourth point P4. The first point P1, the second point P2, and/or the third point P3 may be disposed on the inner surface of the first antenna 410. The fourth point P4 may be disposed on the inner surface of the second antenna 420.

According to various embodiments, the first point P1 may be disposed adjacent to the first segment portion 401. The third point P3 may be disposed adjacent to the second segment portion 402. The second point P2 may be disposed between the first point P1 and the third point P3. The fourth point P4 may be disposed on the second antenna 420 adjacent to the second segment portion 402.

According to an embodiment, the first matching circuit SW1 may be electrically connected to the first point P1. The first matching circuit SW1 may transfer, under control of the processor 450, a feeding signal and/or a ground signal to the first point P1. The first matching circuit SW1 may convert the electrical length and/or frequency band of the first antenna 410 through the first point P1.

Figure 14:
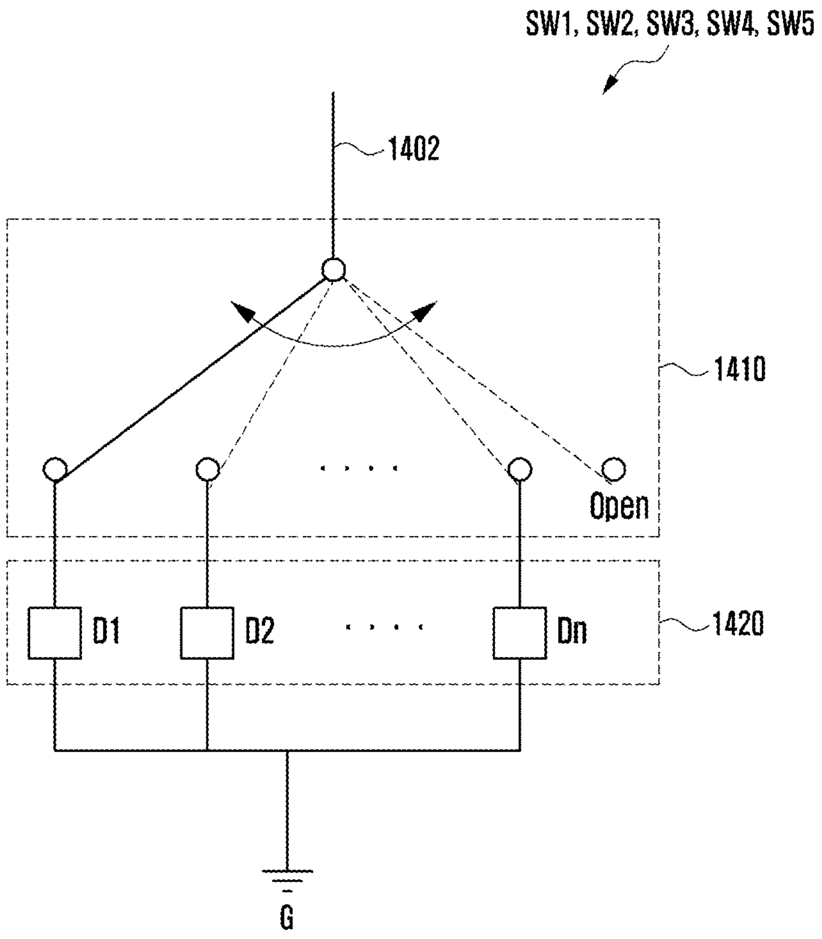
FIG. 14 illustrates the configuration of a matching circuit according to an embodiment of the disclosure.

According to various embodiments, the first matching circuit SW1 may include, for example, a first switch (e.g., the switch 1410 in FIG. 14) and/or a first passive element 421 (e.g., the passive element 1420 in FIG. 14). The first matching circuit SW1 may be electrically connected to or electrically disconnected from the first point P1 by the first switch and the first passive element 421.

According to various embodiments, the first switch (not shown) may include a micro-electro mechanical systems (MEMS) switch. The MEMS switch performs a mechanical switching operation by an inner metal plate, and has fully turning-on/off characteristics, and thus may not substantially affect a change in radiation characteristics of the first antenna 410. The first switch (not shown) may include a switch including a single pole single throw (SPST), a single pole double throw (SPDT), or at least three throws. The first passive element 421 may include capacitors or inductors, which have different element values. The first matching circuit SW1 and the first passive element 421 may ground the first point P1 through a first ground G1.

According to various embodiments, the embodiment related to the first switch (not shown) and the first passive element 421 of the first matching circuit SW1 may be substantially equally applied to a second switch to a fifth switch (not shown), a second passive element 422, a third passive element 424, a fourth passive element (not shown), and/or a fifth passive element (not shown). For example, the second switch to the fifth switch (not shown) may include the switch 1410 illustrated in FIG. 14. The second passive element 422, the third passive element 424, the fourth passive element (not shown), and/or the fifth passive element (not shown) may include the passive element 1420 illustrated in FIG. 14.

According to an embodiment, the second matching circuit SW2 may be electrically connected to the second point P2. The second matching circuit SW2 may transfer, under control of the processor 450, a feeding signal and/or a ground signal to the second point P2. The second matching circuit SW2 may convert the electrical length and/or frequency band of the first antenna 410 through the second point P2. The second matching circuit SW2 may include, for example, the second switch (not shown) and/or the second passive element 422. The second matching circuit SW2 may be electrically connected to or electrically disconnected from the second point P2 by the second switch and the second passive element 422. The second matching circuit SW2 and the second passive element 422 may ground the second point P2 through a second ground G2.

According to an embodiment, the tuner 430 may be electrically connected to the processor 450 through the first power feeder 441. The tuner 430 may be electrically connected to the first point P1 through the first matching circuit SW1. The tuner 430 may be electrically connected to the second point P2 and/or the third point P3. The tuner 430 may be electrically connected to the fourth point P4 through the third matching circuit SW3. The tuner 430 may adjust a frequency band signal transferred through the processor 450 to selectively transfer the same to the first point P1, the second point P2, the third point P3, and/or the fourth point P4. The tuner 430 may selectively control a feeding signal of the first power feeder 441 in order to select the frequency band signal transferred through the processor 450.

According to various embodiments, the tuner 430 may include a fourth matching circuit SW4, a fifth matching circuit SW5, and/or a variable capacitor 435. The fourth matching circuit SW4 and the fifth matching circuit SW5 may select frequency bands under control of the processor 450. The fourth matching circuit SW4 and the fifth matching circuit SW5 may be selectively turned on or off based on the control of the processor 450. The variable capacitor 435 may minutely tune the frequency bands controlled by the processor 450. One end of the fourth matching circuit SW4 may be connected to the first power feeder 441. The other end of the fourth matching circuit SW4 may be connected to the fifth matching circuit SW5. The fifth matching circuit SW5 may be connected to the second point P2, the third point P3, and/or the third matching circuit SW3. One end of the variable capacitor 435 may be connected between the first power feeder 441 and the fourth matching circuit SW4. The other end of the variable capacitor 435 may be connected between the fourth matching circuit SW4 and the fifth matching circuit SW5. The other end of the variable capacitor 435 may also be connected to the first matching circuit SW1.

According to various embodiments, the fourth matching circuit SW4 may include, for example, a fourth switch (not shown) and/or the fourth passive element (not shown). The fifth matching circuit SW5 may include, for example, the fifth switch (not shown) and/or the fifth passive element (not shown).

According to an embodiment, the third matching circuit SW3 may be electrically connected to the processor 450 through a second power feeder 442. The third matching circuit SW3 may be electrically connected to the fourth point P4. The third matching circuit SW3 may be electrically connected to the tuner 430 (e.g., the fifth matching circuit SW5). The third matching circuit SW3 may transfer, under control of the processor 450, a feeding signal and/or a ground signal to the fourth point P4. The third matching circuit SW3 may convert a frequency band of the second antenna 420 through the fourth point P4. The third matching circuit SW3 may include, for example, a third switch (not shown) and/or the third passive element 424. The third matching circuit SW3 may be electrically connected to or electrically disconnected from the fourth point P4 by the third switch and the third passive element 424. The third matching circuit SW3 and the third passive element 424 may ground the fourth point P4 through a third ground G3.

According to an embodiment, the processor 450 may be electrically connected to the first matching circuit SW1, the second matching circuit SW2, the tuner 430, the third matching circuit SW3, the first power feeder 441, and/or the second power feeder 442, and transfer a feeding signal and/or a ground signal. The processor 450 may adjust a matching value of the first matching circuit SW1, the second matching circuit SW2, the tuner 430, and/or the third matching circuit SW3, thereby converting and/or adjusting the frequency band of the first antenna 410 and/or the second antenna 420.

According to various embodiments, the processor 450 may include a communication processor, an RFIC, and/or a wireless communication module 192 (e.g., the wireless communication module 192 in FIG. 1). The processor 450 may be electrically connected to the first antenna 410 and/or the second antenna 420. The processor 450 may control the feeding signals and/or ground signals of the first point P1 to the third point P3 disposed on the first antenna 410 and/or the fourth point P4 disposed on the second antenna 420, and may allow the first antenna 410 and/or the second antenna 420 to operate at a resonance frequency at which the same have the optimum radiation efficiency and performance in a wide band such as a low band (LB) (e.g., about 600 MHz to 960 MHZ), a middle band (MB) (e.g., about 1500 MHz to 2200 MHZ), a high band (HB) (e.g., about 2300 MHz to 2800 MHZ), and/or an ultrahigh band (UHB) (about 3200 MHZ to 4500 MHZ).

Figure 5:
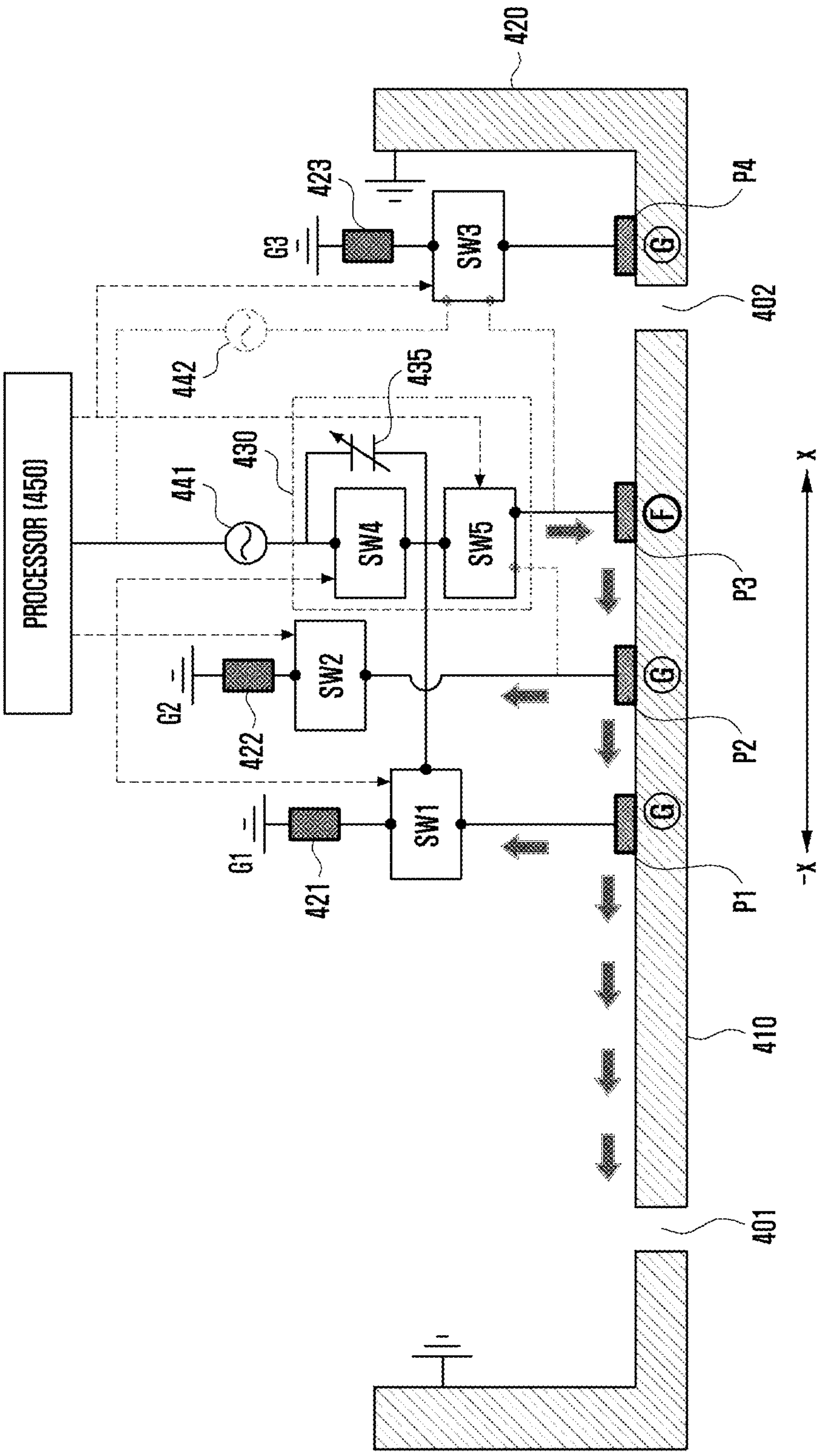
FIG. 5 illustrates an embodiment in which a first frequency band is configured by using a first region of a first antenna of an electronic device according to an embodiment of the disclosure.

FIG. 5 illustrates an embodiment in which a first frequency band is configured by using a first region of a first antenna of an electronic device according to an embodiment of the disclosure.

Figure 6:
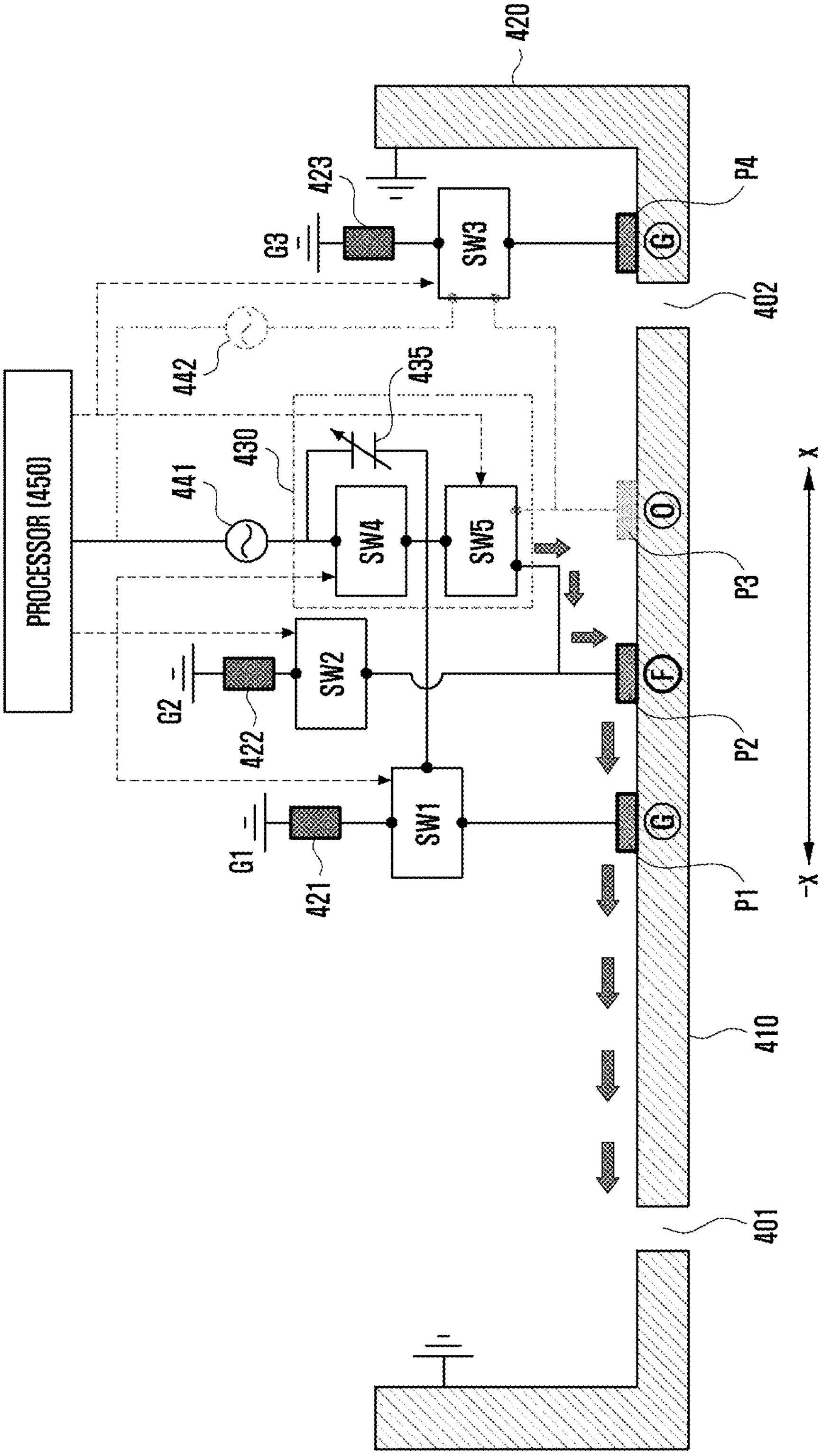
FIG. 6 illustrates an embodiment in which a second frequency band is configured by using a second region of a first antenna of an electronic device according to an embodiment of the disclosure.

FIG. 6 illustrates an embodiment in which a second frequency band is configured by using a second region of a first antenna of an electronic device according to an embodiment of the disclosure.

Figure 7:
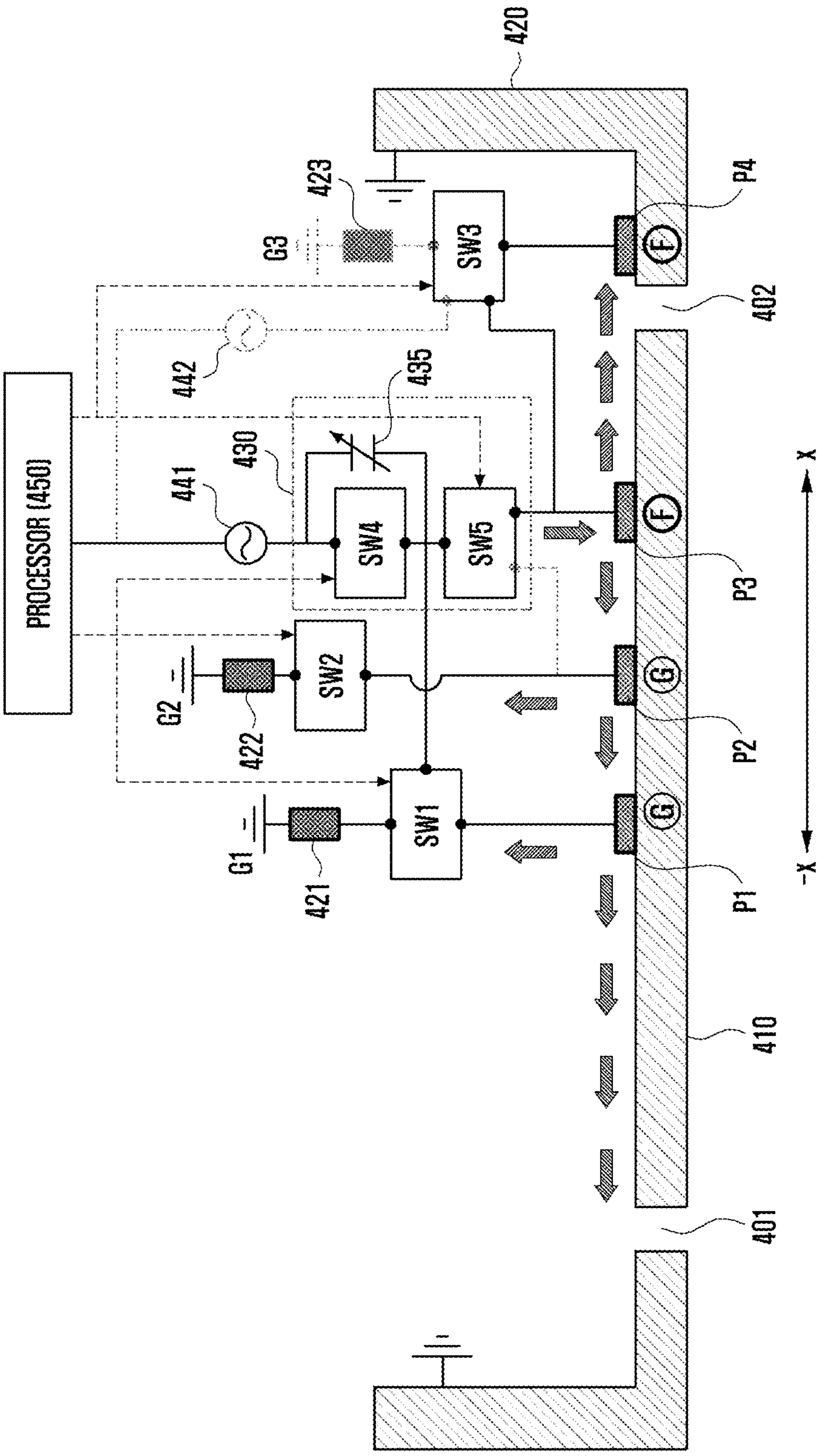
FIG. 7 illustrates an embodiment in which a third frequency band is configured by using a third region of a first antenna of an electronic device according to an embodiment of the disclosure.

FIG. 7 illustrates an embodiment in which a third frequency band is configured by using a third region of a first antenna of an electronic device according to an embodiment of the disclosure.

Figure 8:
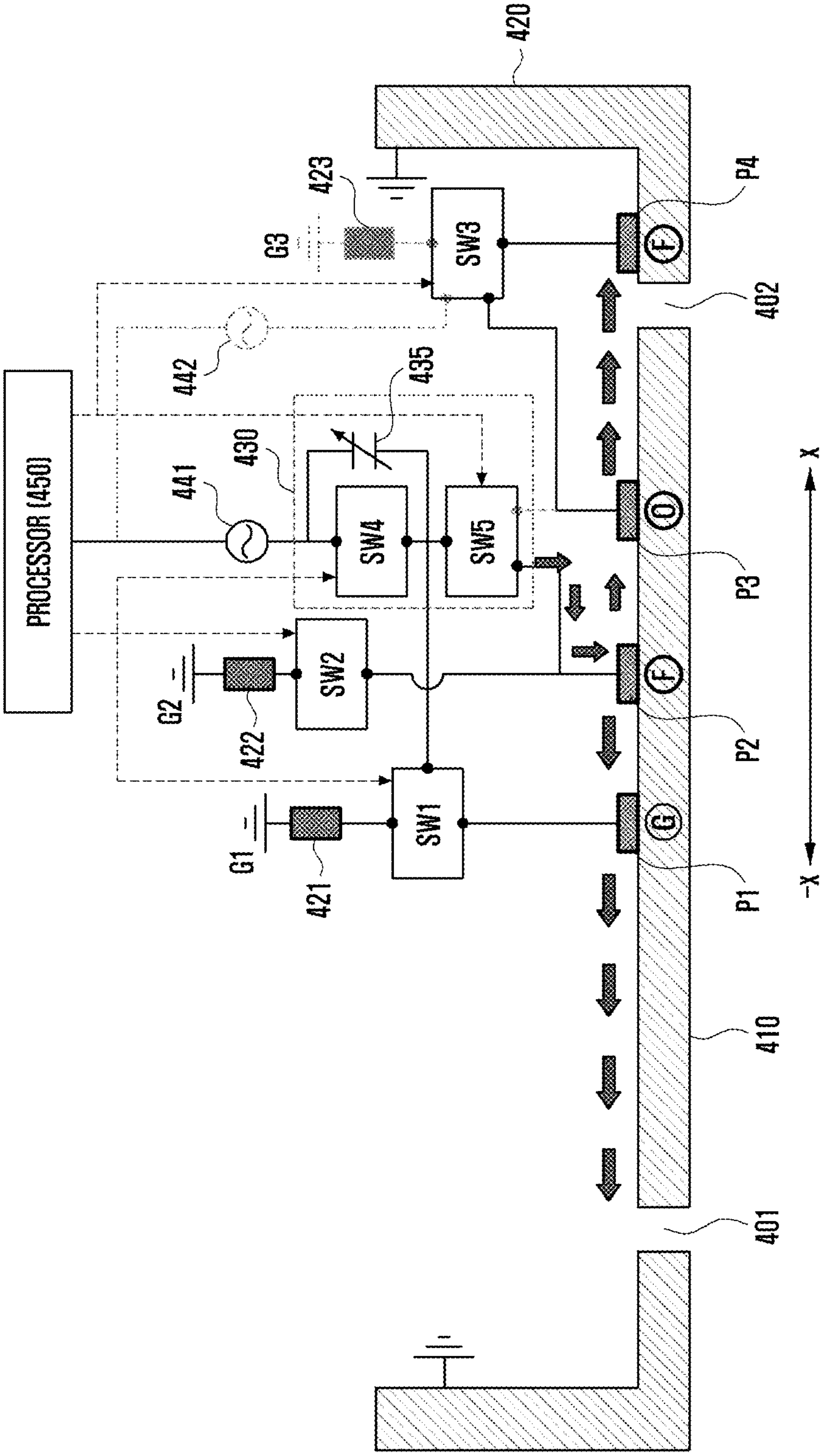
FIG. 8 illustrates an embodiment in which a fourth frequency band is configured by using a fourth region of a first antenna of an electronic device according to an embodiment of the disclosure.

FIG. 8 illustrates an embodiment in which a fourth frequency band is configured by using a fourth region of a first antenna of an electronic device according to an embodiment of the disclosure.

The first frequency band to the fourth frequency band, illustrated in FIGS. 5 to 8, may include various frequency bands which operate in, for example, a low band (e.g., about 600 MHz to 960 MHZ).

Referring to FIGS. 5 to 8, a first point P1 may be disposed adjacent to a first segment portion 401 formed in a first direction (e.g., the −x-axis direction) of a first antenna 410. A third point P3 may be disposed adjacent to a second segment portion 402 formed in a second direction (e.g., the x-axis direction) opposite to the first direction (e.g., the −x-axis direction) of the first antenna 410. A second point P2 may be disposed between the first point P1 and the third point P3. A fourth point P4 may be disposed on a second antenna 420 formed in the second direction (e.g., the x-axis direction) from the second segment portion 402. In an embodiment, the first point P1 may be disposed on a distance of about λ/4 or longer from the first segment portion 401 with reference to a low band.

Referring to FIG. 5, a processor 450 may control the first point P1, the second point P2, the third point P3, and/or the fourth point P4 as feeding (F) points and/or ground (G) points to control the electrical path (e.g., length) of the first antenna 410. For example, the processor 450 may transfer feeding signals and/or ground signals to the first point P1, the second point P2, the third point P3, and/or the fourth point P4, and may control the first antenna 410 to operate in a first frequency band A1 (e.g., a first resonance frequency).

According to an embodiment, the processor 450 may control a first matching circuit SW1 to ground the first point P1. For example, the processor 450 may turn on the first matching circuit SW1 and may connect the first point P1 to a first ground G1. The processor 450 may control a second matching circuit SW2 to ground (G) the second point P2. For example, the processor 450 may turn on a second matching circuit SW2, and may connect the second point P2 to a second ground G2. The processor 450 may control the first power feeder 441 and the tuner 430 to transfer a feeding (F) signal to the third point P3. The fourth point P4 may be in a grounded (G) state.

According to an embodiment, when the first point P1 and the second point P2 are grounded (G) and when the third point P3 is fed (F), the first antenna 410 may use, as a main radiation region, a first region from the third point P3 to the first segment portion 401. The first region from the third point P3 to the first segment portion 401 may operate in the first frequency band A1 (e.g., the first resonance frequency). For example, the first region (e.g., the region from the third point P3 to the first segment portion 401) may operate at the first resonance frequency in about 645 MHz to 655 MHZ.

Referring to FIG. 6, the processor 450 may transfer feeding signals and/or ground signals to the first point P1, the second point P2, the third point P3, and/or the fourth point P4 or may open the points, and may control the first antenna 410 to operate in a second frequency band A2 (e.g., the second resonance frequency).

According to an embodiment, the processor 450 may control the first matching circuit SW1 to ground (G) the first point P1. For example, the processor 450 may turn on the first matching circuit SW1, and may connect the first point P1 to the first ground G1. The processor 450 may control the first power feeder 441 and the tuner 430 to transfer a feeding (F) signal to the second point P2. In another embodiment, the processor 450 may control the second matching circuit SW2 to connect the second point P2 to the second ground G2, and may configure a ground portion connection structure for connecting feeding (F) and a ground (G). The processor 450 may control the first power feeder 441 and the tuner 430 to open the third point P3. The fourth point P4 may be in a grounded (G) state.

According to an embodiment, when the first point P1 is grounded (G), the second point P2 is fed (F), and the third point P3 is opened, the first antenna 410 may use, as a main radiation region, a second region from the second point P2 to the first segment portion 401. The second region from the second point P2 to the first segment portion 401 may operate in the second frequency band A2 (e.g., the second resonance frequency). For example, the second region (e.g., the region from the second point P2 to the first segment portion 401) may operate at the second resonance frequency in about 685 MHz to 695 MHZ.

Referring to FIG. 7, the processor 450 may transfer feeding signals and/or ground signals to the first point P1, the second point P2, the third point P3, and/or the fourth point P4, and may control the first antenna 410 to operate in a third frequency band A3 (e.g., a third resonance frequency).

According to an embodiment, the processor 450 may control the first matching circuit SW1 to ground (G) the first point P1. For example, the processor 450 may turn on the first matching circuit SW1, and may connect the first point P1 to the first ground G1. The processor 450 may control the second matching circuit SW2 to ground (G) the second point P2. For example, the processor 450 may turn on the second matching circuit SW2, and may connect the second point P2 to the second ground G2. The processor 450 may control the first power feeder 441 and the tuner 430 to transfer a feeding (F) signal to the third point P3. The tuner 430 may transfer the feeding (F) signal, transferred through the processor 450 and the first power feeder 441, to the fourth point P4, through the third matching circuit SW3. The fourth point P4 may operate as a feeding (F) point.

According to an embodiment, when the first point P1 is grounded (G), the second point P2 is grounded (G), and the third point P3 is fed (F), and the fourth point P4 is fed (F), the first antenna 410 may use, as a main radiation region, a third region from the first segment portion 401 to the third point P3 and from the third point P3 to the second segment portion 402. The third region from the first segment portion 401 to the third point P3 and from the third point P3 to the second segment portion 402 may operate in the third frequency band A3 (e.g., the third resonance frequency). For example, the third region (e.g., the region from the first segment portion 401 to the third point P3 and from the third point P3 to the second segment portion 402) may operate at the third resonance frequency in about 715 MHz to 725 MHZ.

Referring to FIG. 8, the processor 450 may transfer feeding signals and/or ground signals to the first point P1, the second point P2, the third point P3 and/or the fourth point P4 or may open the points, and may control the first antenna 410 to operate in a fourth frequency band A4 (e.g., a fourth resonance frequency).

According to an embodiment, the processor 450 may control the first matching circuit SW1 to ground (G) the first point P1. For example, the processor 450 may turn on the first matching circuit SW1, and may connect the first point P1 to the first ground G1. The processor 450 may control the first power feeder 441 and the tuner 430 to transfer a feeding (F) signal to the second point P2. In another embodiment, the processor 450 may control the second matching circuit SW2 to connect the second point P2 to the second ground G2, and may configure a ground portion connection structure for connecting feeding (F) and a ground (G). The processor 450 may control the first power feeder 441 and the tuner 430 to open the third point P3.

According to various embodiments, the processor 450 may control the third matching circuit SW3, and may electrically connect the third point P3 and the fourth point P4 to each other. When the third point P3 and the fourth point P4 are electrically connected to each other, the first antenna 410 and the second antenna 420 may operate as a single antenna radiator.

According to an embodiment, when the first point P1 is grounded (G), the second point P2 is fed (F), the third point P3 is opened, and the fourth point P4 is fed (F), the first antenna 410 may use, as a main radiation region, a fourth region from the first segment portion 401 to the second point P2 and from the second point P2 to the second segment portion 402. The fourth region from the first segment portion 401 to the second point P2 and from the second point P2 to the second segment portion 402 may operate in the fourth frequency band A4 (e.g., the fourth resonance frequency). For example, the fourth region (e.g., the region from the first segment portion 401 to the second point P2 and, from the second point P2 to the second segment portion 402) may operate at the fourth resonance frequency in about 765 MHz to 775 MHZ.

Figure 9:
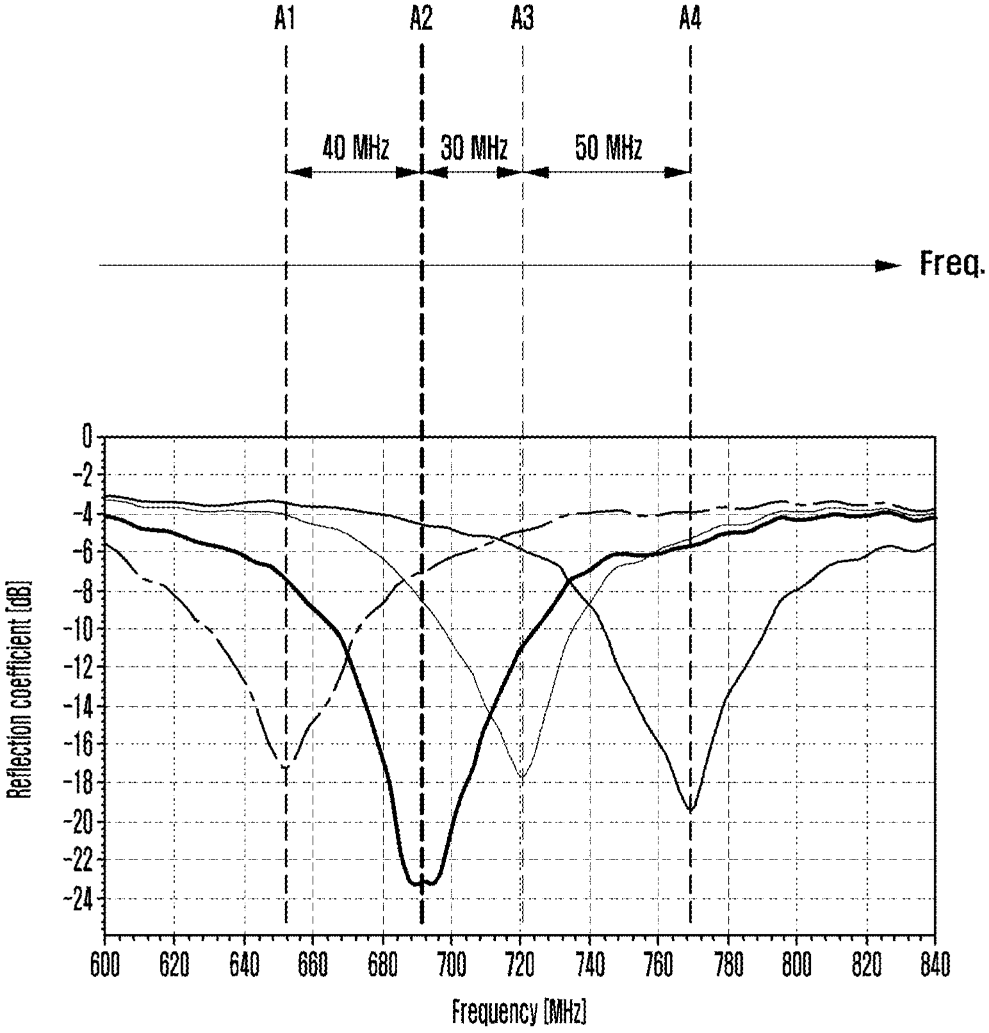
FIG. 9 illustrates an embodiment of a first frequency band to a fourth frequency band of an electronic device according to an embodiment of the disclosure.

FIG. 9 illustrates an embodiment of a first frequency band to a fourth frequency band of an electronic device according to an embodiment of the disclosure.

The first frequency band A1 to the fourth frequency band A4 illustrated in FIG. 9 may include the first frequency band A1 to the fourth frequency band A4 according to the above-described embodiments of FIGS. 5 to 8.

Referring to FIG. 9, the first frequency band A1 and the second frequency band A2 may operate with a range of about 40 MHz therebetween. The second frequency band A2 and the third frequency band A3 may operate with a range of about 30 MHz therebetween. The third frequency band A3 and the fourth frequency band A4 may operate with a range of about 50 MHz therebetween.

According to an embodiment, when the first point P1 and the second point P2 of the first antenna 410 are grounded (G) and the third point P3 is fed (F), the first frequency band A1 may be an operation frequency used when the first region from the third point P3 to the first segment portion 401 is used as a main radiation region. The first frequency band A1 may operate as the first resonance frequency in about 645 MHZ to 655 MHZ.

According to an embodiment, when the first point P1 of the first antenna 410 is grounded (G), the second point P2 is fed (F), and the third point P3 is opened, the second frequency band A2 may be an operation frequency used when the second region from the second point P2 to the first segment portion 401 is used as a main radiation region. The second frequency band A2 may operate as the second resonance frequency in about 685 MHz to 695 MHZ.

According to an embodiment, when the first point P1 of the first antenna 410 is grounded (G), the second point P2 is grounded (G), the third point P3 is fed (F), and the fourth point P4 is fed (F), the third frequency band A3 may be an operation frequency used when the third region from the first segment portion 401 to the third point P3 and from the third point P3 to the second segment portion 402 is used as a main radiation region. The third frequency band A3 may operate as the third resonance frequency in about 715 MHz to 725 MHZ.

According to an embodiment, when the first point P1 of the first antenna 410 is grounded (G), the second point P2 is fed (F), the third point P3 is opened, and the fourth point P4 is fed (F), the fourth frequency band A4 may be an operation frequency used when the fourth region from the first segment portion 401 to the second point P2 and from the second point P2 to the second segment portion 402 is used as a main radiation region. The fourth frequency band A4 may operate as the fourth resonance frequency in about 765 MHz to 775 MHZ.

According to various embodiments, the electronic device 300 may control feeding signals, ground signals, and/or opening of the first point P1 to the third point P3 disposed on the first antenna 410 and/or the fourth point P4 disposed on the second antenna 420, so that the first antenna 410 operates in various low bands (LBs) such as first frequency band (e.g., the first resonance frequency) to the fourth frequency band (e.g., the fourth resonance frequency).

Figure 10:
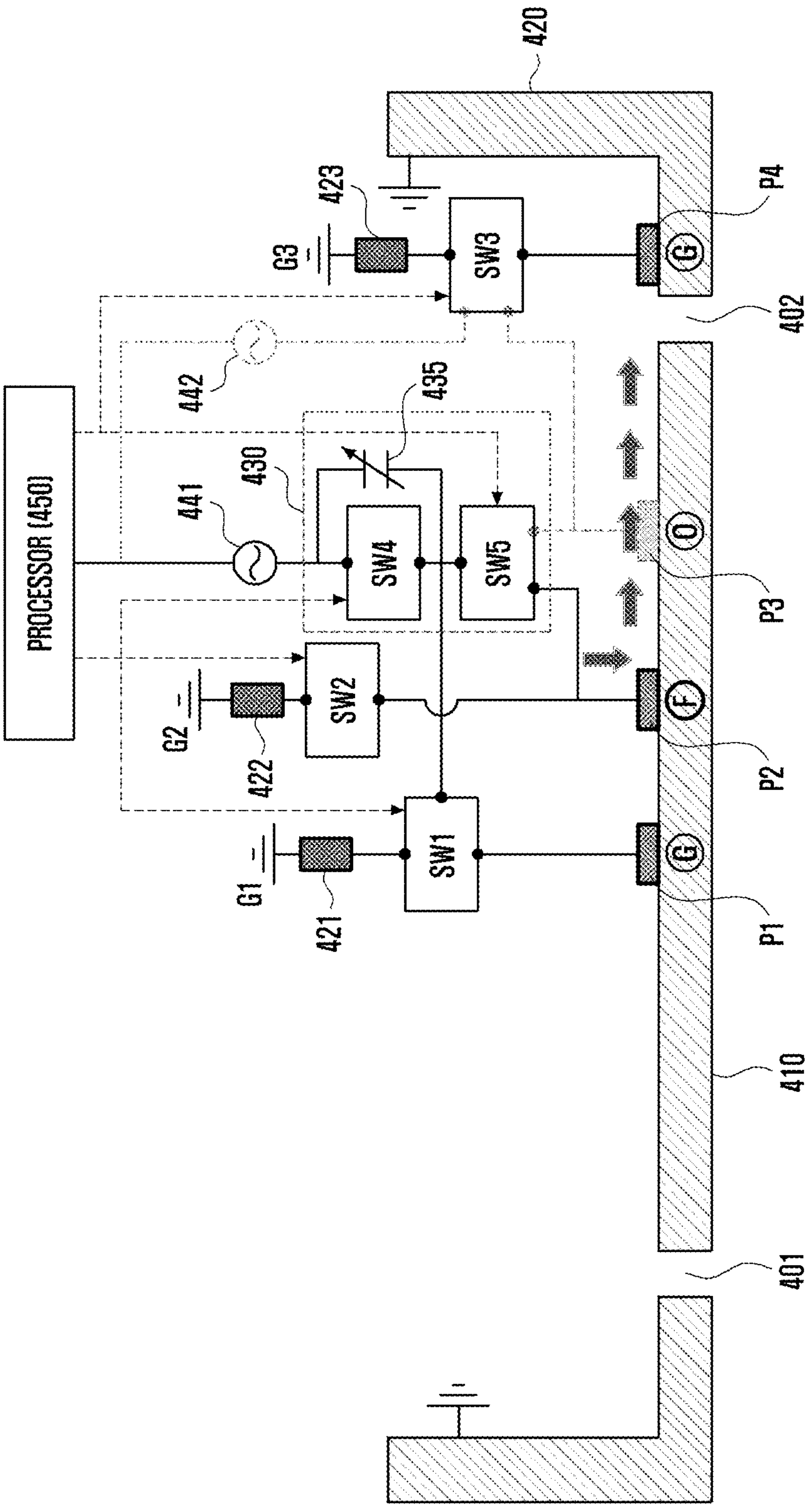
FIG. 10 illustrates an embodiment in which a fifth frequency band is configured by using a fifth region of a first antenna of an electronic device according to an embodiment of the disclosure.

FIG. 10 illustrates an embodiment in which a fifth frequency band is configured by using a fifth region of a first antenna of an electronic device according to an embodiment of the disclosure.

Figure 11:
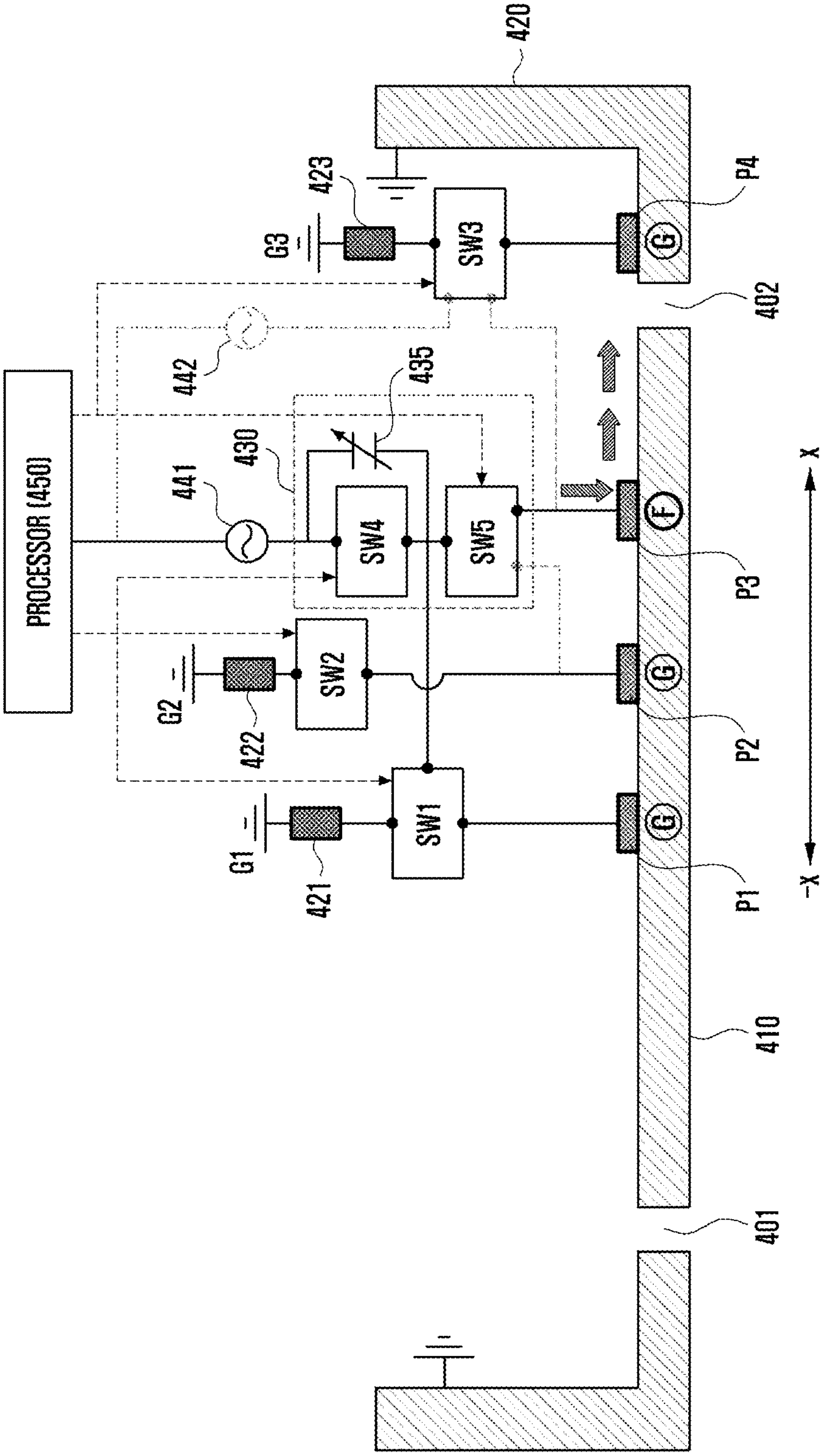
FIG. 11 illustrates an embodiment in which a sixth frequency band is configured by using a sixth region of a first antenna of an electronic device according to an embodiment of the disclosure.

FIG. 11 illustrates an embodiment in which a sixth frequency band is configured by using a sixth region of a first antenna of an electronic device according to an embodiment of the disclosure.

The fifth frequency band and the sixth frequency band, illustrated in FIGS. 10 and 11, may include various frequency bands which operate in, for example, a middle band (MB) (e.g., about 1500 MHz to 2200 MHZ).

The first antenna 410 and the second antenna 420, illustrated in FIGS. 10 and 11, may include the first antenna 410 and the second antenna 420 illustrated in FIGS. 4 to 8. In describing FIGS. 10 and 11, a redundant description of identical elements and operations identical to those illustrated in FIGS. 4 to 8 may be omitted.

Referring to FIG. 10, a processor 450 may control or open a first point P1, a second point P2, and a third point P3 of the first antenna 410 and/or a fourth point P4 of the second antenna 420 as feeding (F) points and/or ground (G) points, and may control the electrical path (e.g., length) of the first antenna 410. For example, the processor 450 may transfer feeding signals and/or ground signals to the first point P1, the second point P2, the third point P3, and/or the fourth point P4 or open the same, and may control the first antenna 410 to operate in a fifth frequency band A5 (e.g., a fifth resonance frequency).

According to an embodiment, the processor 450 may control a first matching circuit SW1 to ground G) the first point P1. The processor 450 may control the first power feeder 441 and the tuner 430 to transfer a feeding (F) signal to the second point P2. In another embodiment, the processor 450 may control a second matching circuit SW2 to connect the second point P2 to a second ground G2, and may configure a ground portion connection structure for connecting feeding (F) and a ground (G). The processor 450 may control the first power feeder 441 and the tuner 430 to open the third point P3. The fourth point P4 may be in a grounded (G) state.

According to an embodiment, when the second point P2 is fed (F) and the third point P3 is opened, the first antenna 410 may use, as a main radiation region, a fifth region from the second point P2 to a second segment portion 402. The fifth region from the second point P2 to the second segment portion 402 may operate in the fifth frequency band A5 (e.g., the fifth resonance frequency). For example, the fifth region (e.g., the region from the second point P2 to the second segment portion 402) may operate at the fifth resonance frequency in about 1700 MHz to 1800 MHZ.

Referring to FIG. 11, the processor 450 may control a first point P1, a second point P2, and a third point P3 of the first antenna 410 and/or a fourth point P4 of the second antenna 420 as feeding (F) points and/or ground (G) points, and may control the electrical path (e.g., length) of the first antenna 410. For example, the processor 450 may transfer feeding signals and/or ground signals to the first point P1, the second point P2, the third point P3 and/or the fourth point P4, and may control the first antenna 410 to operate in a sixth frequency band A6 (e.g., a sixth resonance frequency).

According to an embodiment, a processor 450 may control a first matching circuit SW1 to ground (G) the first point P1. The processor 450 may control a second matching circuit SW2 to ground (G) the second point P2. The processor 450 may control the first power feeder 441 and the tuner 430 to transfer a feeding (F) signal to the third point P3. The fourth point P4 may be in a grounded (G) state.

According to an embodiment, when the third point P3 is fed (F), the first antenna 410 may use, as a main radiation region, a sixth region from the third point P3 to a second segment portion 402. The sixth region from the third point P3 to the second segment portion 402 may operate in the sixth frequency band A6 (e.g., the sixth resonance frequency). For example, the sixth region (e.g., the region from the third point P3 to the second segment portion 402) may operate at the sixth resonance frequency in about 1980 MHz to 2100 MHZ.

Figure 12:
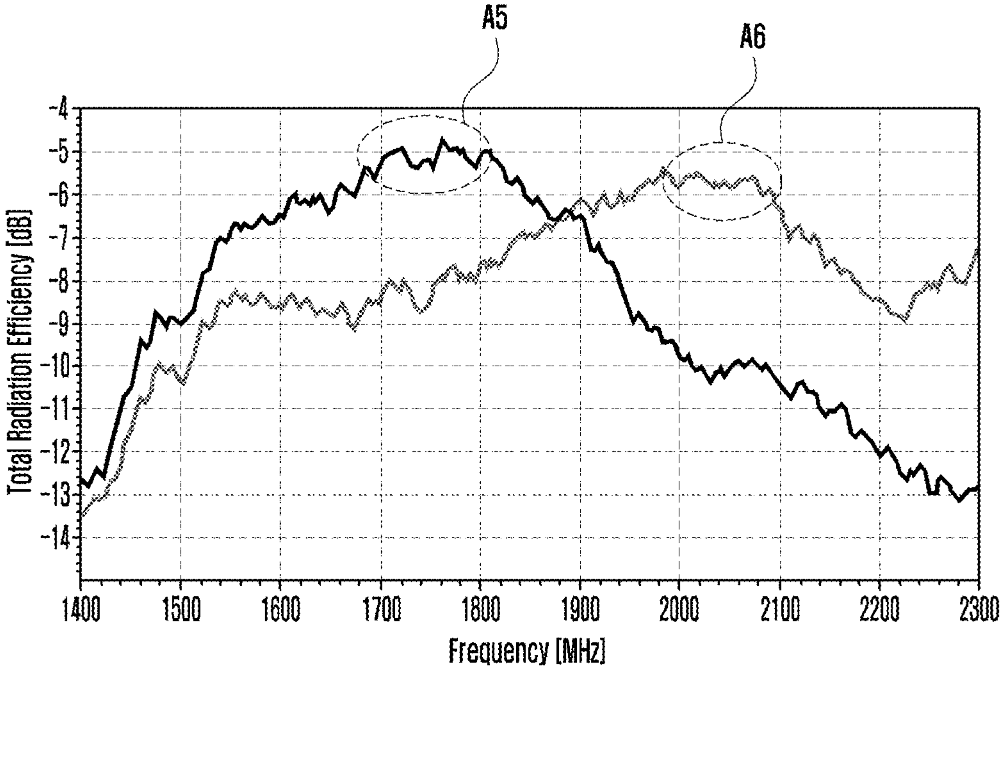
FIG. 12 illustrates an embodiment of a fifth frequency band and a sixth frequency band of an electronic device according to an embodiment of the disclosure.

FIG. 12 illustrates an embodiment of a fifth frequency band and a sixth frequency band of an electronic device according to an embodiment of the disclosure.

Referring to FIG. 12, the fifth frequency band A5 and the sixth frequency band A6, may include the fifth frequency band A5 and the sixth frequency band A6 according to the above-described embodiments of FIGS. 10 and 11.

According to an embodiment, when the second point P2 of the first antenna 410 is fed (F) and the third point P3 is opened, the fifth frequency band A5 may be an operation frequency used when the fifth region from the second point P2 to the second segment portion 402 is used as a main radiation region. For example, the fifth frequency band A5 may operate as the fifth resonance frequency in about 1700 MHZ to 1800 MHZ.

According to an embodiment, when the third point P3 of the first antenna 410 is fed (F), the sixth frequency band A6 may be an operation frequency used when the sixth region from the third point P3 to the second segment portion 402 is used as a main radiation region. For example, the sixth frequency band A6 may operate as the sixth resonance frequency in about 1980 MHz to 2100 MHZ.

According to various embodiments, the electronic device 300 may control feeding signals, ground signals, and/or opening of the first point P1, the second point P2, and/or the third point P3, disposed on the first antenna 410, and may cause the first antenna 410 to operate in various middle bands (MBs) such as the fifth frequency band (e.g., the fifth resonance frequency) and the sixth frequency band (e.g., the sixth resonance frequency).

Figure 13:
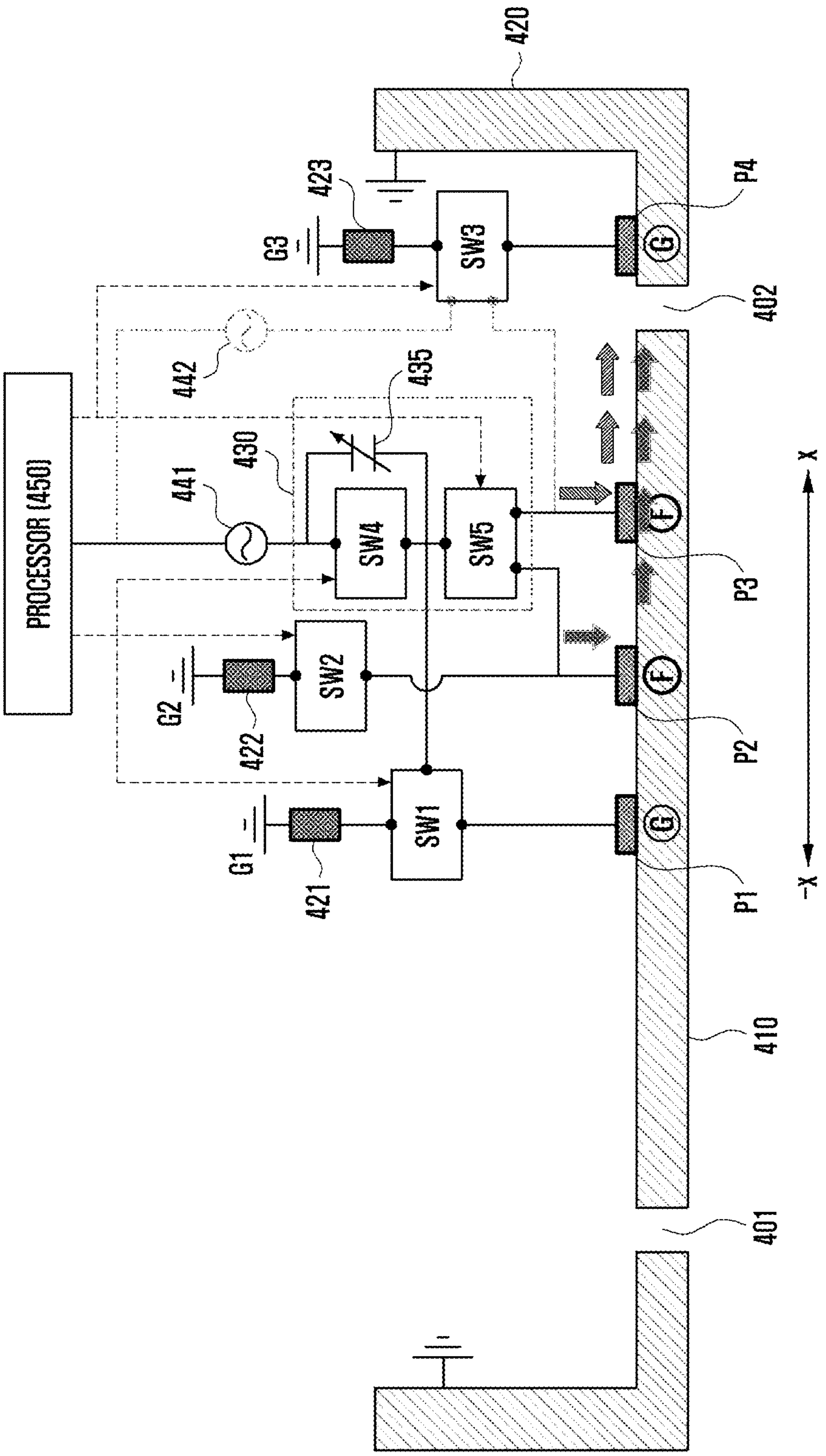
FIG. 13 illustrates an embodiment in which various frequency bands can be simultaneously used by controlling a first point to a third point of a first antenna of an electronic device according to an embodiment of the disclosure.

FIG. 13 illustrates an embodiment in which various frequency bands can be simultaneously used by controlling a first point to a third point of a first antenna of an electronic device according to an embodiment of the disclosure.

Various frequency bands, illustrated in FIG. 13, may include frequency bands which operate in, for example, a low band (e.g., about 600 MHz to 960 MHZ), a middle band (e.g., about 1500 MHz to 2200 MHZ), and/or a high band (e.g., about 2300 MHz to 2800 MHZ).

Referring to FIG. 13, a processor 450 may control a first point P1, a second point P2, a third point P3 of a first antenna 410 and/or a fourth point P4 of a second antenna 420 as feeding (F) points and/or ground (G) points, and may control the electrical path (e.g., length) of the first antenna 410. For example, the processor 450 may transfer feeding signal and/or ground signals to the first point P1, the second point P2, the third point P3, and/or the fourth point P4, and may control the first antenna 410 to operate in various frequency bands.

According to an embodiment, the processor 450 may control a first matching circuit SW1 to ground (G) the first point P1. The processor 450 may control the first power feeder 441 and the tuner 430 to transfer a feeding (F) signal to the second point P2. The processor 450 may control the first power feeder 441 and the tuner 430 to transfer a feeding (F) signal to the third point P3. The fourth point P4 may be in a grounded (G) state.

According to an embodiment, when the second point P2 and the third point P3 are fed (F), the first antenna 410 may simultaneously operate a region (e.g., the fifth region) from the second point P2 to a second segment portion 402 and a region (e.g., the sixth region) from the third point P3 to a second segment portion 402 in a predetermined frequency band. For example, the region (e.g., the fifth region) from the second point P2 to the second segment portion 402 may operate in a low band and/or a middle band. The region (e.g., the sixth region) from the third point P3 to the second segment portion 402 may operate in a high band.

According to various embodiments, the processor 450 may ground (G) the first point P1, the second point P2, and the third point P3 of the first antenna 410, and may transfer a feeding (F) signal to the fourth point P4 of the second antenna 420. For example, the processor 450 may control the second power feeder 442 and the third matching circuit SW3 to use the fourth point P4 as a feeding (F) point. When the fourth point P4 is fed (F), a portion of the second antenna 420 may be used at a resonance frequency which operates in a high band (e.g., about 2300 MHz to 2800 MHZ) and/or an ultrahigh band (about 3200 MHZ to 4500 MHZ).

The electronic device 300 according to various embodiments of the disclosure may control feeding signals, ground signals, and/or open state of the first point P1 to the third point P3 disposed on the first antenna 410 and/or the fourth point P4 disposed on the second antenna 420, and may be configured to operate at a resonance frequency at which the first antenna 410 and/or the second antenna 420 has the optimum radiation efficiency and performance in wide bands such as a low band, a middle band, a high band, and/or an ultrahigh band.

FIG. 14 illustrates the configuration of a matching circuit according to an embodiment of the disclosure. According to various embodiments, the matching circuit illustrated in FIG. 14 may be applied to each of the first matching circuit SW1 to the fifth matching circuit SW5 illustrated in FIGS. 4 to 8, FIG. 10, FIG. 11, or FIG. 13.

Referring to FIG. 14, a first matching circuit SW1, a second matching circuit SW2, a third matching circuit SW3, a fourth matching circuit SW4, or a fifth matching circuit SW5 may include at least one switch 1410 or multiple passive elements 1420 (D1, D2, Dn, open)) which are electrically connected to or electrically disconnected from corresponding electrical paths by the at least one switch 1410 and have different element values. The multiple passive elements 1420 may be applied to each of the first passive element 421, the second passive element 422 and/or the third passive element 424, illustrated in FIGS. 4 to 8, FIG. 10, FIG. 11, or FIG. 13.

According to an embodiment, the multiple passive elements 1420 may include capacitors having various capacitance values and/or inductors having various inductance values.

According to an embodiment, the at least one switch 1410 may be connected, under control of a processor (e.g., the processor 450 in FIG. 4), to an electrical path 1402 which includes an element having a designated element value. In an embodiment, the first matching circuit SW1, the second matching circuit SW2, the third matching circuit SW3, the fourth matching circuit SW4, or the fifth matching circuit SW5 may disconnect the electrical path 1402 through the switch 1410.

According to an embodiment, the at least one switch 1410 may include a micro-electro mechanical systems (MEMS) switch. The MEMS switch may perform a mechanical switching operation by an inner metal plate, and has full turning on/off characteristics, and thus may not substantially affect a change in a radiation characteristic of an antenna. In an embodiment, the at least one switch 1410 may also include a switch including a single pole single throw (SPST), a single pole double throw (SPDT), or at least three throws.

An electronic device 300 according to various embodiments of the disclosure may include a housing 310 including a first segment portion 401 and a second segment portion 402, a first antenna 410 formed between the first segment portion 401 and the second segment portion 402, and a processor 450 electrically connected to the first antenna 410, wherein the first antenna 410 includes a first point P1 disposed adjacent to the first segment portion 401, a third point P3 disposed adjacent to the second segment portion 402, and a second point P2 disposed between the first point P1 and the third point P3, and the processor 450 is configured to control feeding signals and/or ground signals of the first point P1, the second point P2, and/or the third point P3, and control the electrical path of the first antenna 410 between the first segment portion 401 and the second segment portion 402 such that the first antenna 410 operates in different frequency bands.

According to various embodiments, the electronic device 300 may include a first matching circuit SW1 electrically connected between the first point P1 and the processor 450, a second matching circuit SW2 electrically connected between the second point P2 and the processor 450, and a tuner 430 electrically connected between the second point P2, the third point P3, and the processor 450.

According to various embodiments, a first power feeder 441 may be electrically connected between the tuner 430 and the processor 450.

According to various embodiments, the tuner 430 may be electrically connected to the first point P1 through the first matching circuit SW1.

According to various embodiments, the electronic device 300 may include a third segment portion 403 formed at the housing 310, and a second antenna 420 formed between the second segment portion 402 and the third segment portion 403 and electrically connected to the processor 450, wherein the second antenna 420 may include a fourth point P4 disposed adjacent to the second segment portion 402.

According to various embodiments, the electronic device 300 may further include a third matching circuit SW3 electrically connected between the fourth point P4 and the processor 450, and a second power feeder 442 electrically connected between the third matching circuit SW3 and the processor 450.

According to various embodiments, the processor 450 may be configured to control the first point P1 and the second point P2 to be grounded and the third point P3 to be fed, and the first antenna 410 may be configured such that a first region from the first segment portion 401 to the third point P3 operates in a first frequency band.

According to various embodiments, the processor 450 may be configured to control the first point P1 to be grounded, the second point P2 to be fed, and the third point P3 to be opened, and the first antenna 410 may be configured such that a second region from the first segment portion 401 to the third point P3 operates in a second frequency band.

According to various embodiments, the processor 450 may be configured to control the first point P1 to be grounded, the second point P2 to be grounded, the third point P3 to be fed, and the fourth point P4 to be fed, and the first antenna 410 may be configured such that a third region from the first segment portion 401 to the third point P3 and from the third point P3 to the second segment portion 402 operates in a third frequency band.

According to various embodiments, the processor 450 may be configured to control the first point P1 to be grounded, the second point P2 to be fed, the third point P3 to be opened, and the fourth point P4 to be fed, and the first antenna 410 may be configured such that a fourth region from the first segment portion 401 to the second point P2 and from the second point P2 to the second segment portion 402 operates in a fourth frequency band.

According to various embodiments, the processor 450 may be configured to control the first point P1 to be grounded, the second point P2 to be fed, and the third point P3 to be opened, and the first antenna 410 may be configured such that a fifth region from the second point P2 to the second segment portion 402 operates in a fifth frequency band.

According to various embodiments, the processor 450 may be configured to control the first point P1 to be grounded, the second point P2 to be grounded, and the third point P3 to be fed, and the first antenna 410 may be configured such that a sixth region from the third point P3 to the second segment portion 402 operates in a sixth frequency band.

According to various embodiments, the processor 450 may be configured to control the first point P1 to be grounded, the second point P2 to be fed, and the third point P3 to be fed, and the first antenna 410 may be configured such that the region from the second point P2 to the second segment portion 402 and the region from the third point P3 to the second segment portion 402 simultaneously operate in a predetermined frequency band.

According to various embodiments, the first matching circuit SW1 may include a first switch and a first passive element 421, the second matching circuit SW2 may include a second switch and a second passive element 422, and the third matching circuit SW3 may include a third switch and a third passive element 424.

According to various embodiments, each of the first passive element 421, the second passive element 422, and the third passive element 424 may include capacitors or inductors having different element values.

An antenna according to various embodiments of the disclosure may include a first antenna 410 which is disposed between a first segment portion 401 and a second segment portion 402 formed at a housing 310 and includes a first point P1 disposed adjacent to the first segment portion 401, a third point P3 disposed adjacent to the second segment portion 402, and a second point P2 disposed between the first point P1 and the third point P3, and a processor 450 electrically connected to the first antenna 410, wherein the first antenna 410 is configured such that feeding signals and/or ground signals of the first point P1, the second point P2 and/or the third point P3 are controlled under control of the processor 450.

According to various embodiments, the first antenna 410 may include a first matching circuit SW1 electrically connected between the first point P1 and the processor 450, a second matching circuit SW2 electrically connected between the second point P2 and the processor 450, and a tuner 430 electrically connected between the second point P2, the third point P3, and the processor 450.

According to various embodiments, the first antenna 410 may be configured to have an electrical path converted based on control of the processor 450 between the first segment portion 401 and the second segment portion 402 and to operate in different frequency bands.

According to various embodiments, the first antenna 410 may be configured such that, under control of the processor 450, the first point P1 and the second point P2 are grounded, the third point P3 is fed, and a first region from the first segment portion 401 to the third point P3 operates in a first frequency band.

According to various embodiments, the first antenna 410 may be configured such that, under control of the processor 450, the first point P1 is grounded, the second point P2 is fed, the third point P3 is opened, and a second region from the first segment portion 401 to the third point P3 operates in a second frequency band.

While the disclosure has been shown and described with reference to various embodiments thereof, it will be understood by those skilled in the art that various changes in form and details may be made therein without departing from the sprit and scope of the disclosure as defined by the appended claims and their equivalents.

What is claimed is:

1. A portable communication device comprising:

a housing including a side member forming a side surface of the portable communication device, the side member including a first non-conductive portion, a second non-conductive portion, a third non-conductive portion, a first conductive portion between the first non-conductive portion and the second non-conductive portion, and a second conductive portion between the second non-conductive portion and the third non-conductive portion;

a processor;

a first switch configured to electrically connect a ground with a first point on the first conductive portion located by a first distance from the first non-conductive portion;

a second switch configured to electrically connect the ground with a second point on the first conductive portion located by a second distance larger than the first distance from the first non-conductive portion;

a first feeder configured to provide a first feeding signal received from the processor to a third point on the first conductive portion different from the first point and the second point;

a third switch configured to electrically connect a selected one of the ground and a second feeder with a fourth point on the second conductive portion, the second feeder configured to provide a second feeding signal received from the processor; and a tuner comprising a variable capacitor, wherein the variable capacitor adjusts a frequency band under control of the processor, and wherein the tuner is electrically connected with the first point via the first switch.

2. The portable communication device of claim 1, wherein the first conductive portion is to radiate a first signal corresponding to a first specified frequency band, and wherein, when the third switch is electrically connected with the second feeder, the second conductive portion is to radiate a second signal corresponding to a second specified frequency band different from the first specified frequency band.

3. The portable communication device of claim 1, wherein the tuner is electrically connected with the processor via the first feeder.

4. The portable communication device of claim 1, wherein the tuner is electrically connected with at least one point of the first point, the second point or the third point such that the first feeding signal is provided to the at least one point of the first point via the tuner.

5. The portable communication device of claim 1, wherein the tuner is electrically connected with the fourth point via the third switch.

6. The portable communication device of claim 1, wherein the third point is located by a third distance larger than the second distance from the first non-conductive portion.

7. The portable communication device of claim 1, wherein the tuner further includes a fourth switch, and a fifth switch.

8. The portable communication device of claim 7, wherein the variable capacitor is configured to minutely tune frequency bands controlled by the processor.

9. The portable communication device of claim 7, wherein the variable capacitor is connected at a first end between the first feeder and the fourth switch.

10. The portable communication device of claim 9, wherein the variable capacitor is connected at a second end opposite the first end between the fourth switch and the fifth switch.

11. The portable communication device of claim 10, wherein the second end of the variable capacitor is further connected to the first switch.

12. The portable communication device of claim 1, further comprising:
an antenna,
wherein the processor is configured to:
control at least one of feeding signals or ground signals of at least one of the first point, the second point, or the third point, and
control an electrical path of the antenna between the first non-conductive portion and the second non-conductive portion such that the antenna operates in different frequency bands.

13. The portable communication device of claim 12,
wherein the processor is further configured to control the first point and the second point to be grounded and the third point to be fed, and
wherein the antenna is configured such that a first region from the first non-conductive portion to the third point operates in a first frequency band.

14. The portable communication device of claim 12,
wherein the processor is further configured to control the first point to be grounded, the second point to be fed, and the third point to be opened, and
wherein the antenna is configured such that a second region from the first non-conductive portion to the third point operates in a second frequency band.

15. The portable communication device of claim 12,
wherein the processor is further configured to control the first point to be grounded, the second point to be grounded, the third point to be fed, and the fourth point to be fed, and
wherein the antenna is configured such that a third region from the first non-conductive portion to the third point and from the third point to the second non-conductive portion operates in a third frequency band.

16. The portable communication device of claim 12,
wherein the processor is further configured to control the first point to be grounded, the second point to be fed, the third point to be opened, and the fourth point to be fed, and
wherein the antenna is configured such that a fourth region from the first non-conductive portion to the second point and from the second point to the second non-conductive portion operates in a fourth frequency band.

17. The portable communication device of claim 12,
wherein the processor is further configured to control the first point to be grounded, the second point to be fed, and the third point to be opened, and
wherein the antenna is configured such that a fifth region from the second point to the second non-conductive portion operates in a fifth frequency band.

18. The portable communication device of claim 12,
wherein the processor is further configured to control the first point to be grounded, the second point to be grounded, and the third point to be fed, and
wherein the antenna is configured such that a sixth region from the third point to the second non-conductive portion operates in a sixth frequency band.

19. The portable communication device of claim 12,
wherein the processor is further configured to control the first point to be grounded, the second point to be fed, and the third point to be fed, and
wherein the antenna is configured such that a region from the second point to the second non-conductive portion and the region from the third point to the second non-conductive portion simultaneously operate in a predetermined frequency band.

* * * * *